(12) United States Patent
Hu

US008355608B2

(10) Patent No.: US 8,355,608 B2
(45) Date of Patent: Jan. 15, 2013

(54) METHOD AND APPARATUS FOR IN-LINE FIBER-CLADDING-LIGHT DISSIPATION

(75) Inventor: Yongdan Hu, Bothell, WA (US)

(73) Assignee: Lockheed Martin Corporation, Bethesda, MD (US)

( * ) Notice: Subject to any disclaimer, the term of this patent is extended or adjusted under 35 U.S.C. 154(b) by 316 days.

(21) Appl. No.: 12/793,508

(22) Filed: Jun. 3, 2010

(65) Prior Publication Data

US 2011/0249935 A1    Oct. 13, 2011

Related U.S. Application Data

(60) Provisional application No. 61/343,949, filed on Apr. 12, 2010.

(51) Int. Cl.
*G02B 6/26* (2006.01)
*G02B 6/42* (2006.01)
*G02B 6/00* (2006.01)

(52) U.S. Cl. ............... 385/27; 385/31; 385/39; 385/48; 385/134; 385/138

(58) Field of Classification Search ............. 385/27, 385/138
See application file for complete search history.

(56) References Cited

U.S. PATENT DOCUMENTS

| | | |
|---|---|---|
| 4,575,181 A | 3/1986 | Ishikawa |
| 4,852,117 A | 7/1989 | Po |
| 4,894,127 A | 1/1990 | Wong et al. |
| 5,136,818 A | 8/1992 | Bramson |
| 5,336,366 A | 8/1994 | Cain et al. |
| 5,898,715 A | 4/1999 | LeGrange et al. |
| 6,167,177 A | 12/2000 | Sandstrom et al. |
| 6,428,217 B1 * | 8/2002 | Giltner .......................... 385/95 |
| 6,905,627 B2 | 6/2005 | Wei et al. |
| 6,969,205 B2 | 11/2005 | Duesterberg et al. |
| 7,010,204 B2 | 3/2006 | Reith et al. |
| 7,090,411 B2 | 8/2006 | Brown |
| 7,199,924 B1 | 4/2007 | Brown et al. |
| 7,215,860 B2 | 5/2007 | Engelberth et al. |
| 7,309,175 B1 | 12/2007 | Rosiewicz et al. |
| 7,391,561 B2 | 6/2008 | Di Teodoro et al. |
| 7,429,734 B1 | 9/2008 | Tidwell |
| 7,471,705 B2 | 12/2008 | Gerstenberger et al. |
| 7,539,231 B1 | 5/2009 | Honea |
| 7,551,823 B2 | 6/2009 | Reith et al. |
| 7,768,700 B1 | 8/2010 | Savage-Leuchs |

(Continued)

*Primary Examiner* — Ryan Lepisto
(74) *Attorney, Agent, or Firm* — Charles A. Lemaire; Jonathan M. Rixen; Lemaire Patent Law Firm, P.L.L.C.

(57) ABSTRACT

Apparatus and method for in-line cladding-light dissipation including forming a light-scattering surface on the optical fiber such that the light-scattering surface scatters cladding light away from the optical fiber. In some embodiments, the apparatus includes an optical fiber having a core and a first cladding layer that surrounds the core, wherein a first portion of the optical fiber has a light-scattering exterior surface. Some embodiments further include a transparent enclosure, wherein the transparent enclosure includes an opening that extends from a first end of the transparent enclosure to a second end of the transparent enclosure, and wherein at least the first portion of the optical fiber is located within the opening of the transparent enclosure. Some embodiments include a light-absorbing housing that surrounds the optical fiber and the transparent enclosure and is configured to absorb the light scattered away from the optical fiber by the light-scattering exterior surface.

25 Claims, 10 Drawing Sheets

U.S. PATENT DOCUMENTS

| | | |
|---|---|---|
| 7,813,603 B2 | 10/2010 | Nikolajsen |
| 7,872,794 B1 | 1/2011 | Minelly et al. |
| 8,202,268 B1 | 6/2012 | Wells et al. |
| 2007/0172174 A1* | 7/2007 | Scerbak et al. .............. 385/76 |
| 2007/0206909 A1* | 9/2007 | Wetter et al. ................ 385/92 |
| 2007/0225771 A1* | 9/2007 | Wegrzyn et al. ............. 607/36 |
| 2007/0230884 A1 | 10/2007 | Minelly et al. |
| 2007/0292087 A1 | 12/2007 | Brown |
| 2009/0238526 A1 | 9/2009 | Reith et al. |
| 2011/0122482 A1 | 5/2011 | Mead |

* cited by examiner

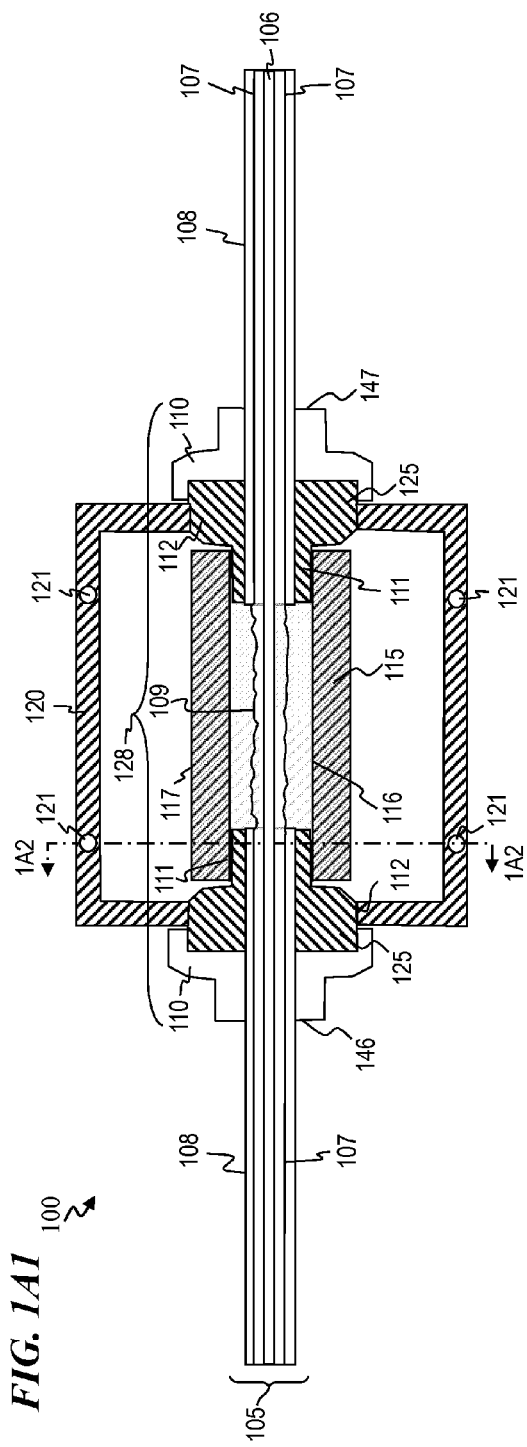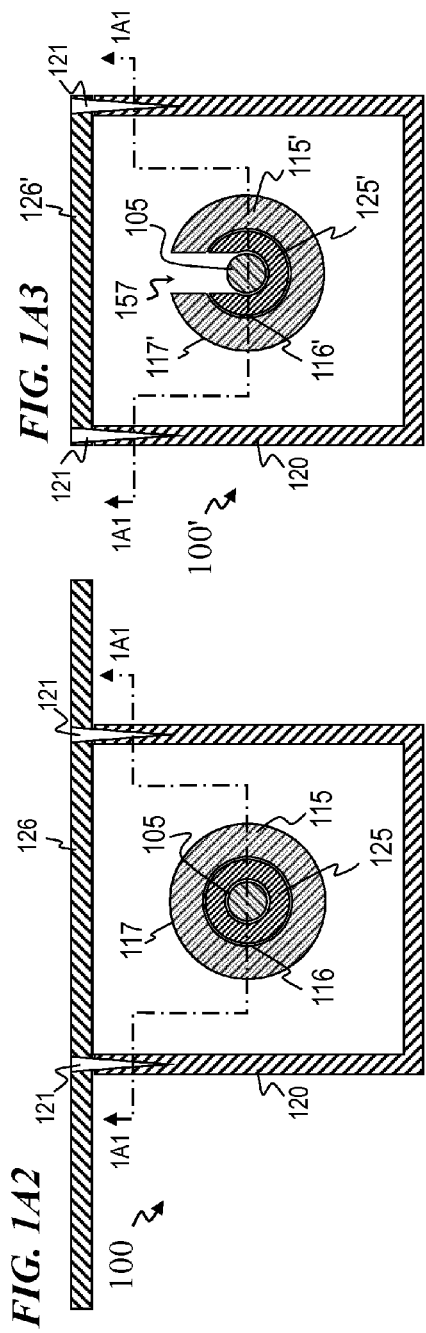

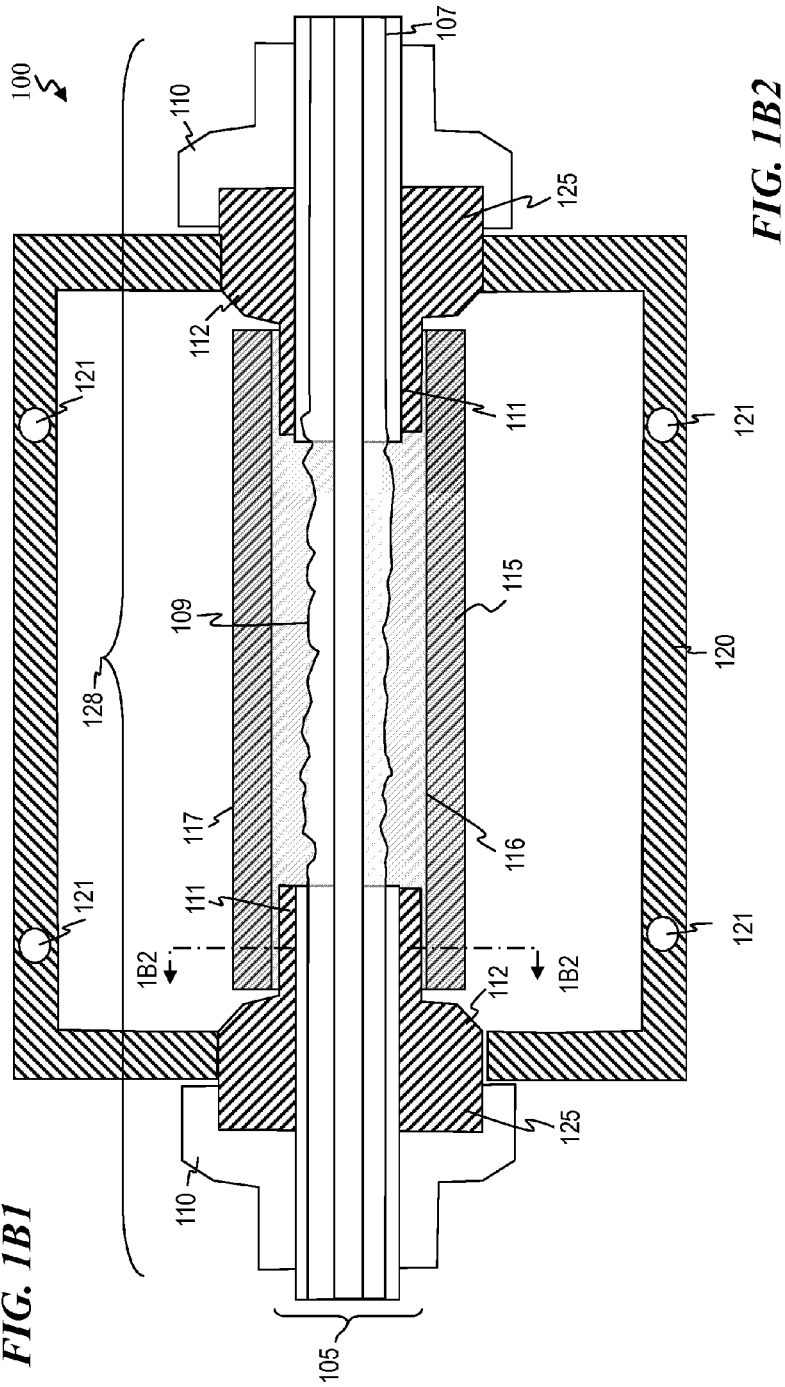
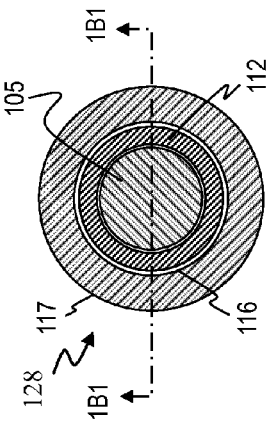
FIG. 1B1
FIG. 1B2

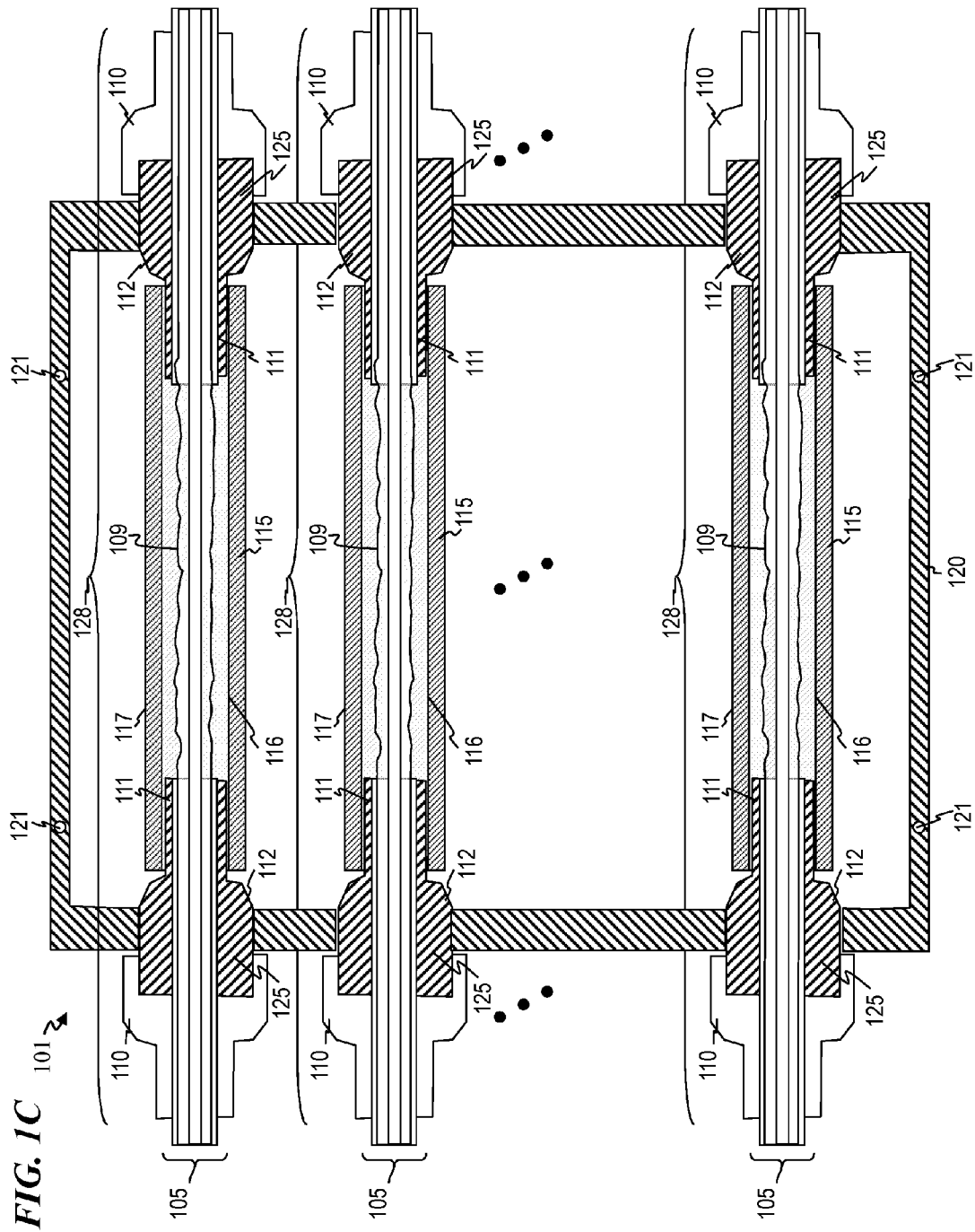

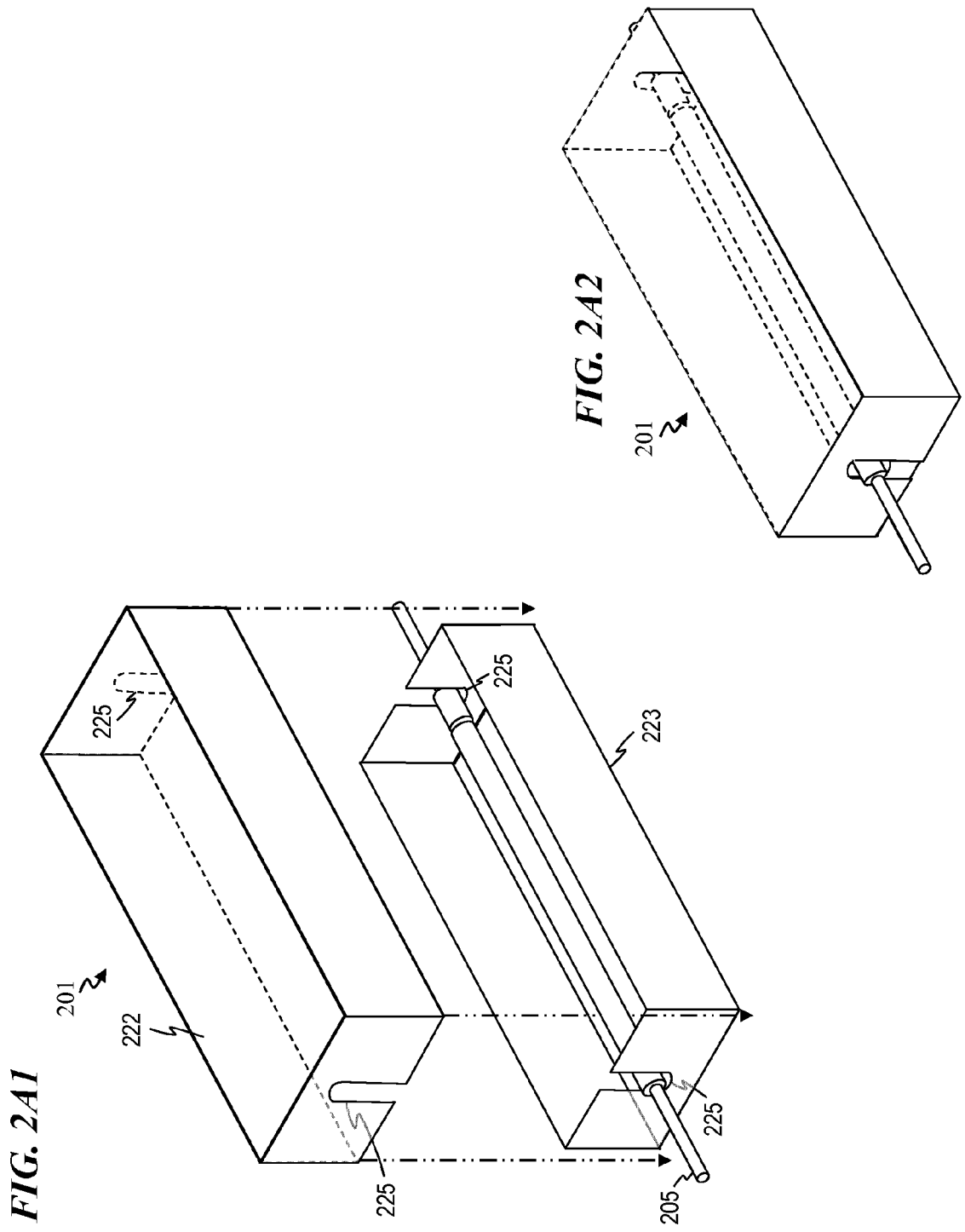

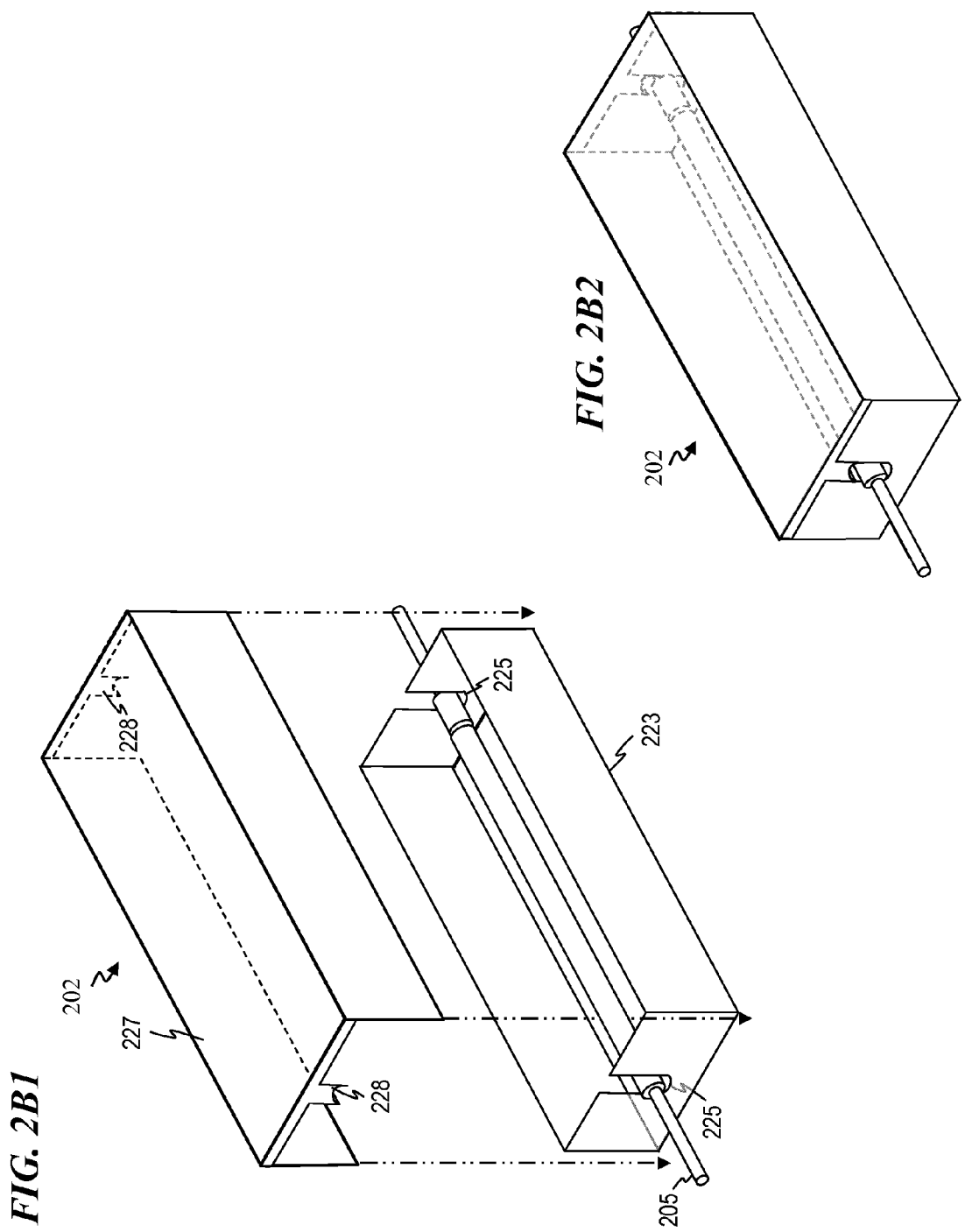

METHOD AND APPARATUS FOR IN-LINE FIBER-CLADDING-LIGHT DISSIPATION

CROSS-REFERENCE TO RELATED APPLICATIONS

This application claims priority benefit under 35 U.S.C. §119(e) to U.S. Provisional Patent Application No. 61/343,949 filed on Apr. 12, 2010, titled "METHOD AND APPARATUS FOR IN-LINE FIBER-CLADDING-LIGHT DISSIPATION" by Yongdan Hu, which is incorporated herein by reference in its entirety.

This invention is related to:

U.S. Pat. No. 7,539,231 titled "APPARATUS AND METHOD FOR GENERATING CONTROLLED-LINEWIDTH LASER-SEED-SIGNALS FOR HIGH-POWERED FIBER-LASER AMPLIFIER SYSTEMS" that issued May 26, 2009 to Eric C. Honea et al., U.S. Pat. No. 7,471,705 titled "ULTRAVIOLET LASER SYSTEM AND METHOD HAVING WAVELENGTH IN THE 200-NM RANGE" that issued Dec. 30, 2008 to David C. Gerstenberger et al., U.S. Pat. No. 7,391,561 titled "FIBER- OR ROD-BASED OPTICAL SOURCE FEATURING A LARGE-CORE, RARE-EARTH-DOPED PHOTONIC-CRYSTAL DEVICE FOR GENERATION OF HIGH-POWER PULSED RADIATION AND METHOD" that issued Jun. 24, 2008 to Fabio Di Teodoro et al., U.S. Pat. No. 7,429,734 titled "SYSTEM AND METHOD FOR AIRCRAFT INFRARED COUNTERMEASURES TO MISSILES" that issued Sep. 30, 2008 to Steven C. Tidwell, U.S. Pat. No. 7,199,924 titled "APPARATUS AND METHOD FOR SPECTRAL-BEAM COMBINING OF HIGH-POWER FIBER LASERS," which issued on Apr. 3, 2007 to Andrew J. W. Brown et al., U.S. patent application Ser. No. 11/565,619 titled "METHOD AND APPARATUS FOR OPTICAL GAIN FIBER HAVING SEGMENTS OF DIFFERING CORE SIZES" filed on Nov. 30, 2006 by Matthias P. Savage-Leuchs (which issued as U.S. Pat. No. 7,768,700 on Aug. 3, 2010), U.S. patent application Ser. No. 11/688,854 filed Mar. 20, 2007 by John D. Minelly et al., titled "METHOD AND APPARATUS FOR OPTICAL DELIVERY FIBER HAVING CLADDING WITH ABSORBING REGIONS" (which issued as U.S. Pat. No. 7,835,608 on Nov. 16, 2010), U.S. patent application Ser. No. 12/018,193 titled "HIGH-ENERGY EYE-SAFE PULSED FIBER AMPLIFIERS AND SOURCES OPERATING IN ERBIUM'L-BAND" filed Jan. 22, 2008 by John D. Minelly et al. (which issued as U.S. Pat. No. 7,872,794 on Jan. 18, 2011), U.S. patent application Ser. No. 12/050,937 titled "A METHOD AND MULTIPLE-MODE DEVICE FOR HIGH-POWER SHORT-PULSE-LASER ABLATION AND CW CAUTERIZATION OF BODILY TISSUES" filed Mar. 18, 2008 by Jonathon Wells et al. (which issued as U.S. Pat. No. 8,202,268 on Jun. 19, 2012), U.S. patent application Ser. No. 12/624,327 titled "SPECTRALLY BEAM COMBINED LASER SYSTEM AND METHOD AT EYE-SAFER WAVELENGTHS" filed Nov. 23, 2009 by Roy D. Mead (which published as U.S. Application Publication US 2011/0122482 on May 26, 2011), U.S. Provisional Patent Application 61/263,736 filed Nov. 23, 2009 by Matthias P. Savage-Leuchs et al., titled "Q-switched oscillator seed-source for MOPA laser illuminator method and apparatus,"

U.S. Provisional Patent Application 61/343,948 filed on Apr. 12, 2010, titled "High Beam Quality and High Average Power from Large-Core-Size Optical-Fiber Amplifiers; Signal and Pump Mode-Field Adaptor for Double-Clad Fibers and Associated Method" by Matthias Savage-Leuchs et al., and U.S. Provisional Patent Application 61/343,945 filed on Apr. 12, 2010, titled "Apparatus for Optical Fiber Management and Cooling" by Yongdan Hu et al., which are all hereby incorporated herein by reference.

FIELD OF THE INVENTION

The invention relates generally to optical waveguides, and more particularly to removing cladding light from a waveguide and to methods and apparatus for in-line removal and dissipation of cladding light from an optical fiber.

BACKGROUND OF THE INVENTION

Residual light inside the cladding of an optical fiber (e.g., pump light and/or signal light; together these are referred to as "cladding light") often produces detrimental or, in some cases, catastrophic problems for the device or related components/systems associated with the optical fiber (e.g., a laser source). Therefore, it is desirable to strip cladding light off of the optical fiber at various positions in order for the corresponding device to work properly and reliably.

Conventional methods of stripping cladding light usually create excessive localized heat for the corresponding device to dissipate. Accordingly, existing cladding light dissipaters have very limited performance in power handling and are inherently unreliable.

U.S. Pat. No. 4,575,181 (hereinafter, "Ishikawa"), titled "OPTICAL FIBER ASSEMBLY WITH CLADDING LIGHT SCATTERING MEANS", issued Mar. 11, 1986, and is incorporated herein by reference. Ishikawa describes an optical fiber having a core and a cladding that is covered with a protecting film. The film is removed in a predetermined region extending from the end face of the optical fiber along the optical fiber, and the cladding is exposed. The surface of the exposed cladding is formed with a rough surface, and a laser beam which is transmitted to the cladding is scattered externally from the rough surface. The optical fiber is mounted on the hollow holder, and the rough surface of the cladding is disposed in the holder. The beam component scattered externally from the rough surface is absorbed by the light absorbing layer on the inner surface of the holder.

Other patents that can be used with or in the present invention include U.S. Pat. No. 5,336,366 (hereinafter, "Cain et al."), titled "NEW DRY ETCH TECHNIQUE", issued Aug. 9, 1994; U.S. Pat. No. 6,905,627 (hereinafter, "Wei et al."), titled "ETCHING METHOD FOR FABRICATING HIGH QUALITY OPTICAL FIBER PROBE", issued Jun. 14, 2005; U.S. Pat. No. 5,136,818 (hereinafter, "Bramson"), titled "METHOD OF POLISHING OPTICAL FIBER", issued Aug. 11, 1992; U.S. Pat. No. 4,894,127 (hereinafter, "Wong et al."), titled "METHOD FOR ANODIZING ALUMINUM", issued Jan. 16, 1990; and U.S. Pat. Nos. 7,199,924, 7,391,561, 7,429,734, 7,471,705, and 7,539,231; U.S. patent application Ser. Nos. 11/565,619, 11/688,854, 12/018,874, 12/050,937, and 12/624,327; and U.S. Provisional Patent Application No. 61/263,736; which are each incorporated herein by reference.

There is a need for an improved cladding-light dissipater and method, particularly cladding-light dissipaters having improved power handling and reliability.

BRIEF SUMMARY OF THE INVENTION

In some embodiments, the present invention provides an optical fiber having a core and a first cladding layer that surrounds the core, wherein a first portion of the optical fiber has a light-scattering exterior surface, and wherein the light-scattering exterior surface is configured to scatter light (which was located within the first cladding layer) away from the optical fiber, a transparent enclosure, wherein the transparent enclosure includes an opening that extends from a first end of the transparent enclosure to a second end of the transparent enclosure, and wherein at least the first portion of the optical fiber having the light-scattering exterior surface is located within the opening of the transparent enclosure (which thus at least partially surrounds the first portion having the light-scattering exterior surface), and wherein the transparent enclosure is not a cladding layer on the optical fiber, a light-absorbing housing, which at least partially surrounds the transparent enclosure, and which is configured to absorb the light scattered away from the optical fiber by the light-scattering exterior surface, a first mechanism configured to hold the optical fiber in a fixed relationship to the transparent enclosure, and a second mechanism configured to hold the transparent enclosure in a fixed relationship to the light-absorbing housing. As used herein, the enclosure is considered a transparent enclosure when it is substantially transparent at least to the wavelength of interest (e.g., transparent to the pump-light wavelength).

In some embodiments, the present invention provides a method for removing cladding light from an optical fiber, the method including providing an optical fiber having a core and a first cladding layer that surrounds the core, providing a transparent enclosure having an opening that extends from a first end of the transparent enclosure to a second end of the transparent enclosure, wherein the transparent enclosure is not a cladding layer on the optical fiber, forming a light-scattering exterior surface of a first portion of the optical fiber such that the light-scattering exterior surface scatters the cladding light located in the first cladding layer away from the optical fiber, providing a light-absorbing housing configured to absorb the cladding light scattered away from the optical fiber, threading (i.e., guiding) or otherwise placing the optical fiber through the opening in the transparent enclosure such that at least the light-scattering exterior surface of the first portion of the optical fiber is at least partially enclosed in the transparent enclosure, holding the optical fiber in a fixed relationship to the transparent enclosure and holding the transparent enclosure in a fixed relationship to the light-absorbing housing, propagating the cladding light scattered away from the optical fiber through the transparent enclosure, and absorbing the propagated cladding light in the light-absorbing housing.

BRIEF DESCRIPTION OF THE FIGURES

FIG. 1A1 is a longitudinal schematic cross-sectional view of an in-line cladding-light dissipater 100.

FIG. 1A2 is a lateral cross-sectional view of cladding-light dissipater 100 as viewed along line 1A2 of FIG. 1A1.

FIG. 1A3 is a lateral cross-sectional view of an alternative cladding-light dissipater 100' as viewed along line 1A2 of FIG. 1A1.

FIG. 1B1 is a magnified longitudinal cross-sectional view of in-line cladding-light dissipater 100.

FIG. 1B2 is a lateral cross-sectional view of fiber-enclosure assembly 128 as viewed along line 1B2.

FIG. 1C is a schematic cross-sectional view of an in-line cladding-light dissipation system 101.

FIG. 2A1 is a perspective exploded view of a light-absorbing housing 201.

FIG. 2A2 is a perspective view of an assembled light-absorbing housing 201.

FIG. 2B1 is a perspective exploded view of a light-absorbing housing 202.

FIG. 2B2 is a perspective view of an assembled light-absorbing housing 202.

FIG. 3 is a perspective view of a light-absorbing housing 301.

DETAILED DESCRIPTION OF THE INVENTION

Figure 1D:
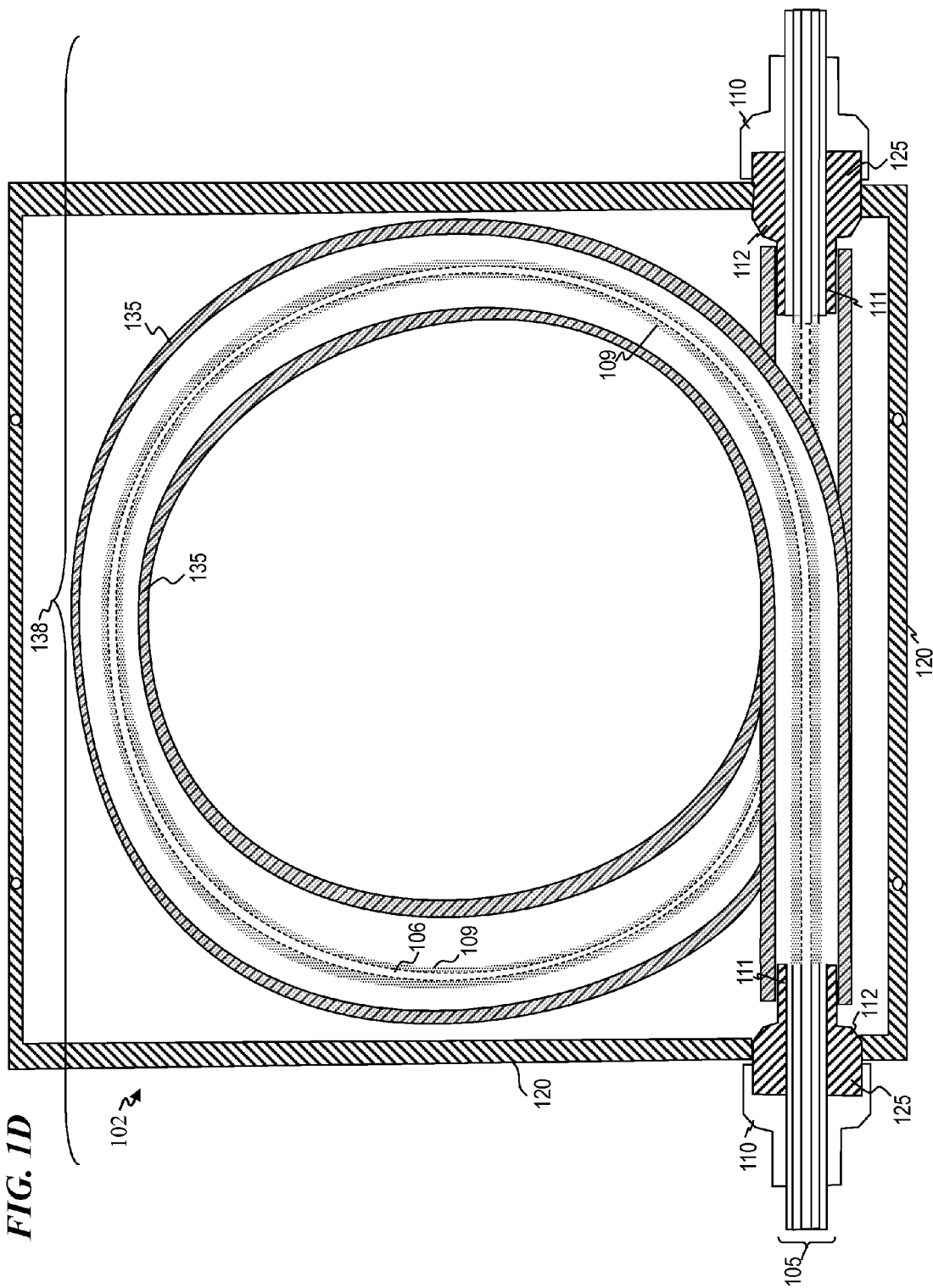
FIG. 1D is a schematic cross-sectional view of an in-line cladding-light dissipater 102.

Although the following detailed description contains many specifics for the purpose of illustration, a person of ordinary skill in the art will appreciate that many variations and alterations to the following details are within the scope of the invention. Accordingly, the following preferred embodiments of the invention are set forth without any loss of generality to, and without imposing limitations upon the claimed invention.

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

The leading digit(s) of reference numbers appearing in the Figures generally corresponds to the Figure number in which that component is first introduced, such that the same reference number is used throughout to refer to an identical component which appears in multiple Figures. Signals and connections may be referred to by the same reference number or label, and the actual meaning will be clear from its use in the context of the description.

As used herein, an optical signal (the signal) is light of a signal wavelength being amplified, or of a laser output (and may or may not be modulated with information), and optical pump light is light of the wavelength used to input optical energy and power to an optical amplifier or laser. As used herein, "cladding light" refers to light propagating in the cladding of an optical fiber and can include either signal light or pump light or both. In some embodiments, the present invention provides methods and apparatus for in-line dissipation of cladding light from an optical fiber. Some optical fibers have multiple cladding layers, wherein the core, having a high index of refraction, contains, guides, and amplifies the signal wavelength, and is surrounded by an inner cladding, having a lower index of refraction, which contains, guides, and delivers the pump wavelength over the length of the core, and is in turn surrounded by an outer cladding having an even lower index of refraction to contain the pump light in the inner cladding.

FIG. 1A1 is schematic cross-sectional view (not necessarily to scale for all embodiments of the invention) of an in-line cladding-light dissipater 100 as viewed along line 1A1 of FIG. 1A2. In some embodiments, dissipater 100 includes an optical fiber 105 having a core 106, surrounded by a first cladding layer 107. In some embodiments, core 106 is used to carry an optical signal. In some embodiments, first cladding layer 107 is used to carry optical pump light and inject it into core 105 over a length of core 105. In some embodiments, cladding 107 is surrounded by one or more additional claddings, such as a second cladding layer 108. In some embodiments, second cladding layer 108 is, includes, or is surrounded by, a polymer coating or jacket.

FIG. 1A2 is a cross-sectional view of cladding-light dissipater 100 as viewed along line 1A2 of FIG. 1A1. As shown in FIG. 1A2, in some embodiments, optical fiber 105 does not include second cladding layer 108 at the location of viewing line 1A2. In some embodiments, an opaque cover plate (or a mounting substrate (such as a system-enclosure wall) that also acts as a cover plate) 126 (e.g., in some embodiments, made of metal, ceramic and/or other suitable material) is affixed using bolts (or other suitable fasteners) screwed into mounting features 121. Cover plate 126 is used to complete the opaque enclosure 120, thus enclosing transparent enclosure 115 within a light-tight or substantially light-tight volume.

Figure 3:
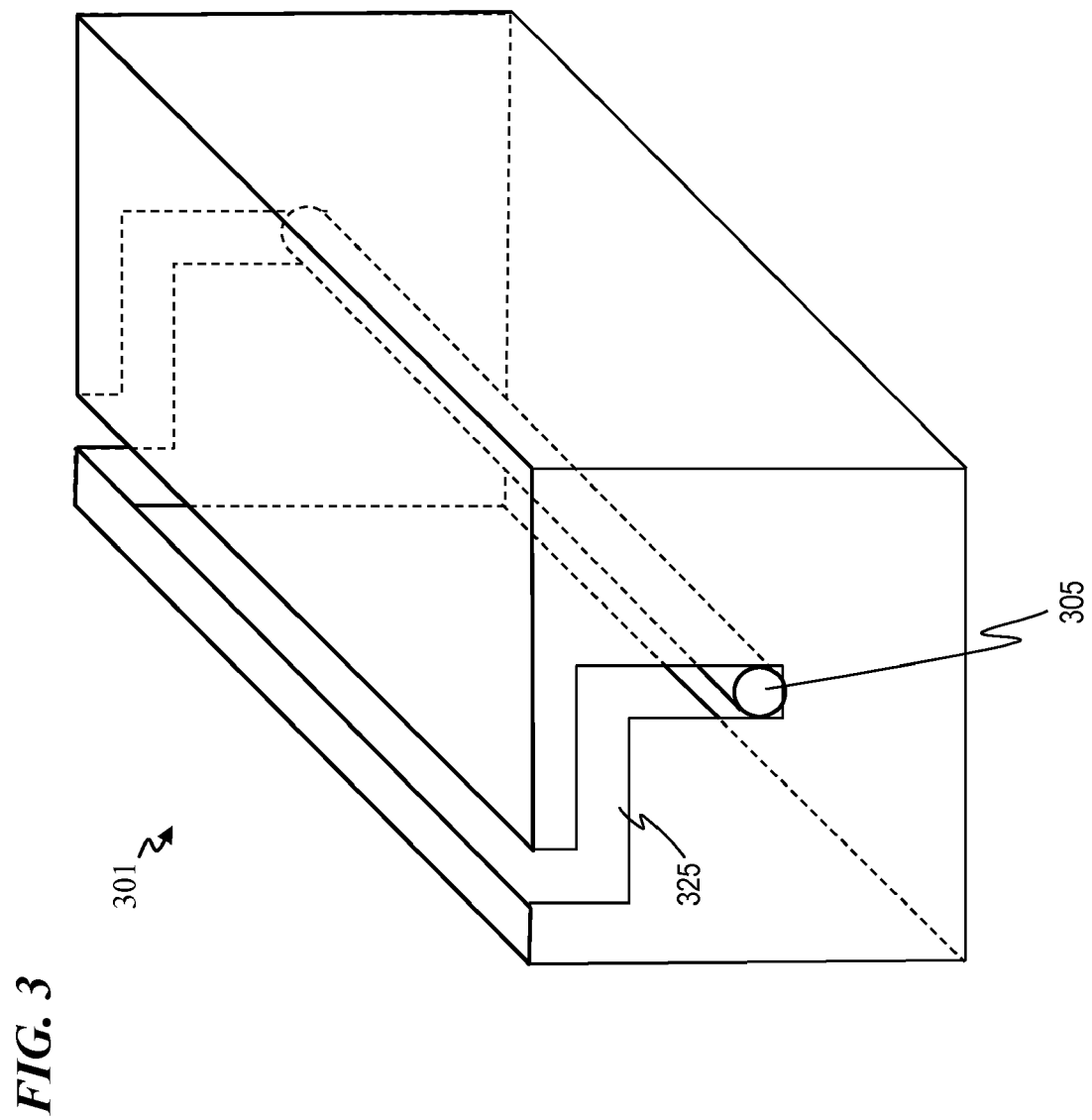

FIG. 1A3 is a cross-sectional view of an alternative cladding-light dissipater 100' as viewed along line 1A2 of FIG. 1A1. In some embodiments, FIG. 1A1 also represents the longitudinal cross section of dissipater 100' as viewed along line 1A1 of FIG. 1A3. In some embodiments, alternative cladding-light dissipater 100' includes a slot 157 that extends the length of slotted transparent enclosure 115' and a corresponding slot in slotted ferrule 125'. These slots permit fiber 105 to be inserted through the side of slotted transparent enclosure 115' and slotted ferrule 125', rather than being threaded through a through hole as is the case with transparent enclosure 115 and ferrule 125 of FIG. 1A1. Slotted transparent enclosure 115' has an outer diameter 117' and an inner diameter 116'. In some embodiments, fiber 105 is placed into its desired location after slotted transparent enclosure 115' and slotted ferrule 125' are affixed within enclosure 120, thus reducing the possibility of fiber damage during assembly. In some embodiments, once fiber 105 is placed into its desired location in slotted transparent enclosure 115' and slotted ferrule 125', fiber 105 is fastened in place, e.g., by carefully crimping the two ferrules 125', or by using a transparent epoxy, or by laser welding a piece of glass over at least part of the open slot 157. In some embodiments, cover 126' is large enough to cover the rest of enclosure 120 as shown in FIG. 1A2, while in other embodiments, a mounting substrate 126 such as reference 126 of FIG. 1A1, which is much larger than the rest of enclosure 120, is used instead to completely enclose slotted transparent enclosure 115' by bolting, soldering, welding or otherwise affixing the rest of enclosure 120 to the mounting substrate 126.

FIG. 1B1 is a magnified longitudinal cross-sectional view of in-line cladding-light dissipater 100, as viewed along line 1B1 of FIG. 1B2. The various features and reference numbers are as described for FIG. 1A1.

FIG. 1B2 is a cross-sectional view of the fiber-enclosure assembly 128 shown in FIG. 1B1, as viewed along line 1B2 of FIG. 1B1. The various features and reference numbers are as described for FIG. 1A2.

Referring again to FIG. 1A1, In some embodiments, a portion of optical fiber 105 includes a light-scattering surface 109 (in some embodiments, a rough surface formed on cladding layer 107) that is configured to scatter light (i.e., cladding light) located in the first cladding layer 107 away from optical fiber 105. In some embodiments, the light-scattering portion of the fiber (the length of the fiber having light-scattering surface 109) is enclosed in a fiber-enclosure assembly 128, wherein fiber-enclosure assembly 128 is substantially enclosed in and affixed to a housing 120. In some embodiments, light-scattering surface 109 is formed directly on cladding layer 107 wherein any second cladding layer 108 is completely removed. In some embodiments, light-scattering surface 109 is formed by wet etching the exterior surface of cladding layer 107. One wet etching technique usable with the present invention is described in U.S. Pat. No. 6,905,627 (hereinafter, "Wei et al."), titled "ETCHING METHOD FOR FABRICATING HIGH QUALITY OPTICAL FIBER PROBE", issued Jun. 14, 2005, and incorporated herein by reference. Wei et al. describe techniques for chemically etching a fiber tip to form a smooth fiber probe. In some embodiments, light-scattering surface 109 of the present invention is formed by wet etching cladding layer 107 with hydrofluoric acid. In some embodiments, light-scattering surface 109 is formed by wet etching cladding layer 107 with any other suitable wet etchant(s).

In some embodiments, light-scattering surface 109 of the present invention is formed by dry etching optical fiber 105. A dry etching technique usable with the present invention is described in U.S. Pat. No. 5,336,366 (hereinafter, "Cain et al."), titled "NEW DRY ETCH TECHNIQUE", issued Aug. 9, 1994, and incorporated herein by reference. Cain et al. describe a dry etcher and method using two chambers that is used for anisotropic or isotropic etching.

In some embodiments, light-scattering surface 109 is formed by affixing a suitable powder to the exterior surface of cladding layer 107 using a suitable binder material (such as epoxy). In some embodiments, the powder and binder has an index of refraction that is higher than the index of refraction of cladding layer 107 such that cladding light located within cladding layer 107 is drawn to light-scattering surface 109 created by the powder and thereby scattered away from optical fiber 105. In some embodiments, the binder includes an epoxy.

In some embodiments, light-scattering surface 109 is formed by polishing the exterior of cladding layer 107. In some embodiments, the exterior of cladding layer 107 is polished using diamond powder. In some embodiments, light-scattering surface 109 is formed by polishing the exterior of cladding layer 107 with any other suitable polishing media. A method for polishing an optical fiber usable with the present invention is described in U.S. Pat. No. 5,136,818 (hereinafter, "Bramson"), titled "METHOD OF POLISHING OPTICAL FIBER", issued Aug. 11, 1992, and incorporated herein by reference. Bramson describes an optical glass fiber polishing apparatus and method utilizing a slurry of water, CeO, glycerin and where needed, a base such as NaOH, to realize transmission loss in the fiber as it is polished towards the fiber core. The intensity of light introduced at one end of the fiber is measured at the opposite end, continuously and without interruption of the polishing, to determine polishing progress through the cladding towards the core. In some embodiments, the method described by Bramson is modified such that a suitably light-scattering surface is achieved.

In some embodiments, light-scattering surface 109 of the present invention is formed by laser ablating or otherwise laser damaging to the exterior of cladding layer 107. One laser-ablation device is described in U.S. patent application Ser. No. 12/050,937 titled "A METHOD AND MULTIPLE- MODE DEVICE FOR HIGH-POWER SHORT-PULSE-LASER ABLATION AND CW CAUTERIZATION OF BODILY TISSUES" filed Mar. 18, 2008 by Jonathon Wells et al. (which issued as U.S. Pat. No. 8,202,268 on Jun. 19, 2012), which is hereby incorporated herein by reference. Rather than ablating bodily tissues as described by Wells et al, instead the present invention performs the laser ablation to form microscopic pits, or otherwise laser surface heating to form microscopic cracks just under the surface of the cladding of fiber 105 or other surface damage, in order to form light-scattering surface 109.

In some embodiments, light-scattering surface 109 has a length of about five centimeter to about twenty centimeters. In some embodiments, light-scattering surface 109 has a length of between about 1 cm and about 2 cm, a length of between about 2 cm and about 3 cm, a length of between about 3 cm and about 4 cm, a length of between about 4 cm and about 5 cm, a length of between about 5 cm and about 6 cm, a length of between about 6 cm and about 7 cm, a length of between about 7 cm and about 8 cm, a length of between about 8 cm and about 9 cm or a length of between about 9 cm and about 10 cm. In some embodiments, light-scattering surface 109 has a length of between about 11 cm and about 12 cm, a length of between about 12 cm and about 13 cm, a length of between about 13 cm and about 14 cm, a length of between about 14 cm and about 15 cm, a length of between about 15 cm and about 16 cm, a length of between about 16 cm and about 17 cm, a length of between about 17 cm and about 18 cm, a length of between about 18 cm and about 19 cm or a length of between about 19 cm and about 20 cm. In some embodiments, light-scattering surface 109 has a length of at least 20 centimeters. In some embodiments, light-scattering surface 109 has a length of between about 50 cm and about 100 cm. In some embodiments, light-scattering surface 109 has a length of between about 100 cm and about 150 cm. In some embodiments, light-scattering surface 109 has a length of between about 150 cm and about 200 cm. In some embodiments, light-scattering surface 109 has a length of between about 200 cm and about 400 cm. In some embodiments, light-scattering surface 109 has a length of between about 400 cm and about 600 cm. In some embodiments, light-scattering surface 109 has a length of between about 600 cm and about 800 cm. In some embodiments, light-scattering surface 109 has a length of between about 800 cm and about 1000 cm. In some embodiments, light-scattering surface 109 has a length of at least 1000 cm. In some embodiments, light-scattering surface 109 has a length of less than one centimeter.

The cladding light "stripped away" (removed and transmitted away) from cladding layer 107 by light-scattering surface 109 is allowed to propagate a certain distance away from optical fiber 105, which expands the size of the surface to absorb the scattered light (i.e., increases the heat dissipation area) and thus avoids excessive localized hot spots on optical fiber 105.

In some embodiments, the fiber-enclosure assembly 128 includes a transparent enclosure 115 (e.g., a glass or sapphire tube) that is supported on both ends by two respective ends or ferrules 125 (e.g., two copper pieces having through holes sized to fit fiber 105, and an outer-diameter 111 on one end sized to fit inside tube 115 and an outer-diameter 112 on the opposite end of ferrule 125 sized to fit the end openings in housing 120), wherein the outside ends 112 are enclosed in a boot 110 (in some embodiments, heat-shrink tubing or similar material). In some embodiments, the fiber 105 is fed through the left-end boot 110, the left-hand-end ferrule 125, housing 120, glass tube 115, the right-hand-end ferrule 125, and the right-end boot 110, then each of these pieces is assembled to one another to center on and enclose light-scattering surface 109. In some embodiments, the outer diameters 112 of ferrules 125 are larger than outer diameter 117 of tube 115 in order that the housing 120 has a snug fit to outer diameters 112 of ferrules 125 while allowing tube 115 to easily fit through the end openings in housing 120 in the case when the two ferrules 125 and tube 115 are assembled in place over the light-scattering surface 109 of fiber 105 before being fit through housing 120. In some embodiments, outer diameter 111 of ferrule 125 is sized to provide a snug fit to the inner diameter 116 of transparent tube 115. In some embodiments, ferrule 125 is carefully crimped to affix it to fiber 105.

In some embodiments, the transparent tube 115 is about 5 cm long and has an outer diameter of about 3 mm and an inner diameter of about 1 mm, the light-scattering surface 109 is about 45 mm long, the outer boundary of the inner cladding 107 of fiber 105 is about four-hundred microns in diameter at the hole through ferrule 125, and housing 120 is about 10 mm by 10 mm by 60 mm long. In some embodiments, the light-scattering surface 109 is a little smaller than about 0.4 mm in diameter. In other embodiments, housing 120 is about 25 mm by 25 mm by 100 mm long or any other suitable size.

In some embodiments, a portion of optical fiber 105, including light-scattering surface 109, is packaged within a light-absorbing housing 120 (see FIG. 1B1 for a magnified view of cladding-light dissipater 100). The light-absorbing housing 120 conceals light-scattering surface 109 to prevent the scattered light from escaping (which helps to prevent eye damage to personnel in the area), and the interior of light-absorbing housing absorbs the scattered light such that the heat from the scattered light is conducted out of dissipater 100. In some embodiments, a heat sink is attached to housing 120 and/or to mounting substrate 126 to provide better heat management. In some embodiments, a fan is located to blow air across housing 120 and/or mounting substrate 126 to provide better heat management. In some embodiments, housing 120 is made from a material that includes silver, copper and/or aluminum. In some embodiments, the interior of housing 120 includes a thin light-absorbing layer. In some embodiments, the thin light-absorbing layer is produced by anodizing the interior of housing 120. An aluminum anodizing technique usable with the present invention is described in U.S. Pat. No. 4,894,127 (hereinafter, "Wong et al."), titled "METHOD FOR ANODIZING ALUMINUM", issued Jan. 16, 1990, and incorporated herein by reference. Wong et al. describe a controlled method for anodizing aluminum comprising formation of an aqueous solution of sulfuric and boric acids, immersion of a workpiece in the solution maintained at about room temperature and controlled application of voltage to achieve a current density not greater than about ten Amperes per square foot. In some embodiments, the thin light-absorbing layer includes a chalcolite. In some embodiments, the thin light-absorbing layer includes any other suitable anodizing or coating product.

In some embodiments, housing 120 includes a plurality of mounting features 121 for attaching a cover plate (e.g., cover plate 126' of FIG. 1A3, or a mounting substrate 126 that also acts as a cover plate of FIG. 1A2) and/or for securing or integrating dissipater 100 to other devices or structures. In some embodiments, the structure to which housing 120 is attached forms the cover plate for completing the enclosure. In some embodiments, mounting features 121 include a plurality of tapped and/or drilled holes or slots for bolting, riveting or screwing dissipater 100 to another device or structure (such as its cover 126).

In some embodiments, a portion of optical fiber 105, including light-scattering surface 109, is "threaded" through a transparent enclosure 115, as shown in FIG. 1A2 (or placed in a slot 157 and held within transparent enclosure 115', as shown in FIG. 1A3) in order to increase the mechanical strength of optical fiber 105 (i.e., improve the fiber integrity).

As used herein, "guided" or "guiding" includes "threaded" or "threading," which refer to inserting one end of an optical fiber into an opening and then pushing or pulling the optical fiber 105 through the opening. In some embodiments, the present invention includes a method that includes threading fiber 105 through each of one or more enclosing parts (e.g., a first piece of heat-shrink tubing 110, a first copper end 125, transparent enclosure (e.g., glass tube) 115 and perhaps the opaque enclosure 120, the second copper end 125, and the second piece of heat-shrink tubing 110) until all or a portion of fiber-enclosure assembly 128 surrounds the portion of the fiber 105 that is to be enclosed. In some embodiments, once the optical fiber 105 has been threaded through these components, the first copper end 125 is fitted into one end of the glass tube 115 such that the glass tube is surrounding the light-scattering surface 109 of the fiber 105, and the second copper end 125 is fitted into the opposite end of the glass tube 115 such that the light-scattering surface 109 of the fiber 105 is between the first copper end 125 and the second copper end 125 and inside the glass tubing 115. These are then placed into the housing 120 such that the light-scattering surface 109 of the fiber 105 is inside the glass tubing 115 which is inside the housing 120. The first piece of heat-shrink tubing 110 is then slid until it is adjacent the housing 120 on one side of the housing 120 and the second piece of heat-shrink tubing 110 is then slid until it is adjacent the housing 120 on the opposite side of the housing 120, and the pieces of heat-shrink tubing 110 are heated so that they shrink in place over the two copper ends 125, which helps hold the copper ends 125 in place within housing 120. In some embodiments, the heat-shrink tubing 110 shrinks against the fiber 105, helping to hold the fiber 105 such that the light-scattering surface 109 of the fiber 105 stays inside the glass tubing 115, which is inside the housing 120.

As used herein, "guided" or "guiding" also includes "placed" or "placing," which refer to inserting a middle portion of an optical fiber into a slot from the side of the slotted unit. In some embodiments, the present invention includes a method that includes threading fiber 105 through each of one or more fiber-holding parts (e.g., a first piece of heat-shrink tubing 110 and a second piece of heat-shrink tubing 110), preassembling other portions (a first slotted copper end 125', slotted transparent enclosure (e.g., glass tube) 115' and a second slotted copper end 125' to one another and to the opaque enclosure 120), and then placing the light-scattering surface 109 portion of fiber 105 (which is between the two pieces of heat-shrink tubing 110) from the top (relative to FIG. 1A3) into slot 157 of slotted transparent enclosure 115' and also into the slotted copper ends 125', all of which have already been preassembled into opaque enclosure 120.

In some embodiments, once the optical fiber 105 has been placed into the slots of these components such that the glass tube 115' is substantially surrounding the light-scattering surface 109 of the fiber 105 and such that the light-scattering surface 109 of the fiber 105 is between the first copper end 125' and the second copper end 125'. The first piece of heat-shrink tubing 110 is then slid until it is over the outer portion of one of the copper ends 125' adjacent the housing 120 on one side of the housing 120 and the second piece of heat-shrink tubing 110 is then slid until it is over the outer portion of the other of the copper ends 125' adjacent the housing 120 on the opposite side of the housing 120, and the pieces of heat-shrink tubing 110 are heated so that they shrink in place over the two copper ends 125'. In some embodiments, the heat-shrink tubing 110 shrinks against the fiber 105, helping to hold the fiber 105 to the copper ends 125' such that the light-scattering surface 109 of the fiber 105 stays inside the glass tubing 115', which is inside the housing 120.

In some embodiments, transparent enclosure 115 (or slotted transparent enclosure 115') is contained within light-absorbing housing 120 such that the cladding light scattered by light-scattering surface 109 propagates through transparent enclosure 115 (or slotted transparent enclosure 115') and is absorbed by light-absorbing housing 120. In some embodiments, transparent enclosure 115 (or slotted transparent enclosure 115') is made from a material that includes sapphire. In some embodiments, transparent enclosure 115 (or slotted transparent enclosure 115') is made from a material that includes fused quartz. In some embodiments, transparent enclosure 115 (or slotted transparent enclosure 115') is made from a material that includes glass or any other suitable transparent material.

In some embodiments, transparent enclosure 115 includes an inner perimeter 116 and an outer perimeter 117. In some embodiments, each of the aspects of transparent enclosure 115 and copper ends 125 have corresponding features in slotted transparent enclosure 115' and slotted copper ends 125' that are shown in FIG. 1A3. In some embodiments, inner perimeter 116 forms the perimeter of an opening in transparent enclosure 115. In some embodiments, optical fiber 105 can be inserted into the opening such that light-scattering surface 109 is enclosed within transparent enclosure 115. In some embodiments, inner perimeter 116 has a diameter that is slightly larger than a diameter of light-scattering surface 109 of optical fiber 105. In some embodiments, both inner perimeter 116 and outer perimeter 117 have a generally circular shape such that transparent enclosure 115 is tubular shaped. In some embodiments, at least the outer perimeter 117 of transparent enclosure 115 has a prism shape. In some embodiments, at least the outer perimeter 117 of transparent enclosure 115 has a rectangular shape. In some embodiments, the outer perimeter of transparent enclosure 115 is any other suitable shape.

In some embodiments, the entire length of light-scattering surface 109 is contained within transparent enclosure 115. In other embodiments, a portion of light-scattering surface 109 may extend beyond the length of transparent enclosure 115. In some embodiments, a first length of at least ten centimeters of the optical fiber extends beyond a first outside end 146 of fiber-enclosure assembly 128 and a second length of at least ten centimeters of the optical fiber extends beyond a second end 147 of fiber-enclosure assembly 128, opposite the first end 146. In some embodiments, a first length of at least 20 cm of the optical fiber extends from the first end 146 of transparent enclosure 115 and a second length of at least 20 cm of the optical fiber extends from the second end 147 of transparent enclosure 115. In some embodiments, a first length of at least 30 cm of the optical fiber extends from the first end 146 of transparent enclosure 115 and a second length of at least 30 cm of the optical fiber extends from the second end 147 of transparent enclosure 115.

In some embodiments, transparent enclosure 115 is held in a fixed position relative to optical fiber 105 via ferrules 125 and/or boots 110. In some embodiments, as described above, ferrules 125 include a first outer-diameter 111 on one end sized to fit inside tube 115 and a second outer-diameter 112 on the opposite end of ferrule 125 sized to fit the end openings in housing 120. In some embodiments, ferrules 125 are manufactured as a single piece (e.g., by sintering powdered metal formed in the desired shape, by casting, machining, or the like). In other embodiments, the portion of ferrule 125 including a first outer diameter 111 and the portion of ferrule 125 including a second outer diameter 112 are manufactured separately and later made integral with each other (e.g., by laser (or other) welding, soldering, press fitting, or the like). In some such embodiments, the portion of ferrule 125 including outer diameter 111 is laser-welded to the portion of ferrule 125 including outer diameter 112. In some such embodiments, the portion of ferrule 125 including outer diameter 111 is soldered to the portion of ferrule 125 including outer diameter 112. In some such embodiments, the portion of ferrule 125 including outer diameter 111 is press fit to the portion of ferrule 125 including outer diameter 112. In some such embodiments, the portion of ferrule 125 including outer diameter 111 is glued to the portion of ferrule 125 including outer diameter 112. In some embodiments, the inner diameter 116 of transparent enclosure 115 is slightly larger than the outer diameter 111 of ferrules 125 such that transparent enclosure 115 fits tightly around the outer diameter 111.

In some embodiments, ferrules 125 are laser-welded to light-absorbing housing 120. In some embodiments, ferrules 125 are soldered to light-absorbing housing 120. In some embodiments, ferrules 125 are press-fit to light-absorbing housing 120. In some embodiments, ferrules 125 are glued to light-absorbing housing 120. In some embodiments, ferrules 125 are fastened to light-absorbing housing 120 in any other suitable manner. In some embodiments, ferrules 125 are connected to boots 110 to stabilize the pathway of optical fiber 105 through housing 120. In some embodiments, boots 110 include heat-shrink-tubing fittings. In some embodiments, the heat-shrink fittings are made from a material that includes a polymer. In some embodiments, ferrules 125 are made from a material that includes copper. In some embodiments, ferrules 125 are made from a material that includes any other suitable material.

In some embodiments, optical fiber 105 follows a path through light-absorbing housing 120 such that optical fiber 105 is threaded through boots 110, ferrules 125, and transparent enclosure 115. In some embodiments, light-scattering surface 109 is formed on optical fiber 105 before threading optical fiber 105 through housing 120. In other embodiments, light-scattering surface 109 is formed after optical fiber 105 is threaded through housing 120. In some such embodiments, the portion of optical fiber 105 where light-scattering surface 109 is formed is not enclosed within transparent enclosure until light-scattering surface 109 is formed.

In some embodiments, light-absorbing housing 120 has a length of about five centimeters to about thirty centimeters. In some embodiments, housing 120 has a length of between about 5 cm and about 6 cm, a length of between about 6 cm and about 7 cm, a length of between about 7 cm and about 8 cm, a length of between about 8 cm and about 9 cm, a length of between about 9 cm and about 10 cm, a length of between about 10 cm and about 12 cm, a length of between about 12 cm and about 14 cm, a length of between about 14 cm and about 16 cm, a length of between about 16 cm and about 18 cm, a length of between about 18 cm and about 20 cm. In some embodiments, housing 120 has a length of between about 20 cm and about 22 cm, a length of between about 22 cm and about 24 cm, a length of between about 24 cm and about 26 cm, a length of between about 26 cm and about 28 cm, a length of between about 28 cm and about 30 cm. In some embodiments, housing 120 has a length of at least 30 centimeters. In some embodiments, housing 120 has a length of less than five centimeters.

FIG. 1C is a schematic cross-sectional view of an in-line cladding-light dissipation system 101. In some embodiments, cladding-light dissipation system 101 includes one light-absorbing housing 120 that encloses a plurality of fiber-enclosure assemblies 128, each having its own optical fiber 105, wherein each optical fiber 105 includes a light-scattering surface 109. In some embodiments, each optical fiber 105 in cladding-light dissipation system 101 is an independent fiber such that none of the fibers 105 are connected to the other fibers 105 of dissipation system 101. In other embodiments, the multiple optical fibers 105 of cladding-light dissipation system 101 represent a parallel cladding-light dissipation configuration, wherein each optical fiber 105 branches off of the same single fiber (not shown) prior to entering system 101, and wherein each optical fiber 105 recombines into the same single fiber (not shown) after leaving system 101. In still other embodiments, the multiple optical fibers 105 shown in cladding-light dissipation system 101 represent a serial cladding-light dissipation configuration, wherein each fiber assembly enclosure 128 is at a different longitudinal position of the same single fiber.

FIG. 1D is a schematic cross-sectional view of an in-line cladding-light dissipater 102. In some embodiments, the portion of optical fiber 105 that contains light-scattering surface 109 is threaded the length of coiled transparent tube 135, in order to increase the length of light-scattering surface 109 used in dissipater 102. In some embodiments, looped transparent enclosure 135 forms a single loop of transparent tubing inside of which is a loop of optical fiber 105 extending between the left-hand ferrule 125 and the right-hand ferrule 125. In other embodiments, looped transparent enclosure 135 forms a plurality of helically stacked loops of transparent tubing inside of which are threaded the same number of loops of optical fiber 105 extending between the left-hand ferrule 125 and the right-hand ferrule 125. In some embodiments, the combination of transparent enclosure 135, ferrules 125, and boots 110 forms fiber-enclosure assembly 138. In some embodiments, cladding-light dissipation system 102 includes one light-absorbing housing 120 that encloses a plurality of optical fibers 105, wherein each optical fiber includes a light-scattering surface 109 and is enclosed by its own fiber-enclosure assembly 138. In some embodiments (not shown), the exit ferrule 125 and the entry ferrule 125 are both located on the same wall of housing 120 (e.g., the ferrule 125 shown in the lower right of FIG. 1D being instead moved to the upper left corner of housing 120 of FIG. 1D, with another half turn of looped transparent enclosure 135). In still other embodiments, an extra one-quarter or three-quarter turn of looped transparent enclosure 135 is used, permitting the exit ferrule 125 to be located on a wall that is ninety degrees relative to the wall having the entry ferrule 125.

Figure 1E:
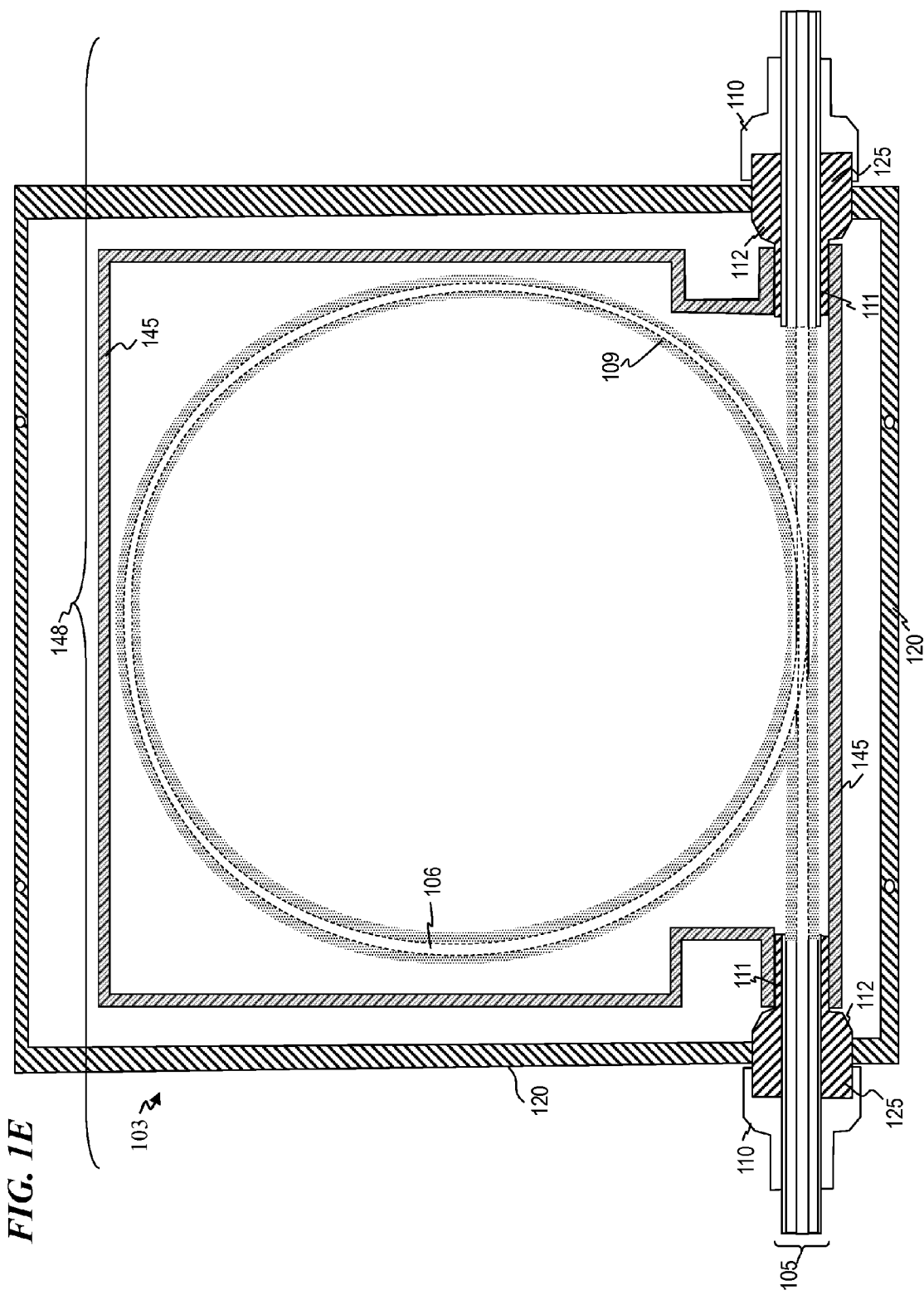
FIG. 1E is a schematic cross-sectional view of an in-line cladding-light dissipater 103.

FIG. 1E is a schematic cross-sectional view of an in-line cladding-light dissipater 103. In some embodiments, the combination of transparent enclosure 145, ferrules 125, and boots 110 forms fiber-enclosure assembly 148. In some embodiments, transparent enclosure 145 holds a single loop of optical fiber 105 extending between the left-hand ferrule 125 and the right-hand ferrule 125. In some embodiments, transparent enclosure 145 has space for a plurality of helically stacked loops of optical fiber 105 extending between the left-hand ferrule 125 and the right-hand ferrule 125. In some embodiments, cladding-light dissipation system 103 includes one light-absorbing housing 120 that encloses a plurality of optical fibers 105, wherein each optical fiber includes a light-scattering surface 109 and is enclosed by its own fiber-enclosure assembly 148. In some embodiments (not shown), the exit ferrule 125 and the entry ferrule 125 are both located on the same wall of housing 120 (e.g., the ferrule 125 shown in the lower right of FIG. 1E being instead moved to the upper left corner of housing 120 of FIG. 1E). In still other embodiments, an extra one-quarter or three-quarter turn of loops of optical fiber 105 is used, permitting the exit ferrule 125 to be located on a wall that is ninety degrees relative to the wall having the entry ferrule 125.

In some embodiments (not shown), the light-scattering surfaces 109 of a plurality of fibers 105 are placed within a single transparent enclosure (e.g., reference numbers 115, 115', 135, or 145). One or more such multi-fiber transparent enclosures are enclosed within a single light-absorbing housing 120.

FIG. 2A1 is a perspective exploded view of a light-absorbing housing 201. In some embodiments, light-absorbing housing 201 includes a first top piece 222 and a second bottom piece 223. In some embodiments, piece 222 and piece 223 each include two slots 225 (one at a first end of each respective piece and one at a second, opposite end of each respective piece). In some embodiments, the slots 225 from top piece 222 overlap with the slots 225 from bottom piece 223 to form an aperture that guides optical fiber 205 through housing 201. In some such embodiments, top piece 222 is slightly larger than bottom piece 223 such that piece 222 is slid over the top of piece 223 such that housing 201 forms a fully-enclosed package around optical fiber 205.

FIG. 2A2 shows light-absorbing housing 201 in its assembled configuration. In some embodiments, housing 201 is made from a material that includes silver, copper, aluminum, and/or other suitable materials. In some embodiments, the housing 201 includes a light-absorbing material such as, for example, coatings with low transmission and low back reflection at a particular wavelength region (e.g., the pump and/or signal wavelengths), and capable of withstanding high heat, such as are available from Evaporated Coatings Inc. (www.evaporatedcoatings.com/attenu.htm). In some embodiments, the housing 201 is covered (to prevent light leaks) by a light-absorbing material such as, for example, light-absorbing black-out material such as is available from Edmund Optics (www.edmundoptics.com/onlinecatalog/displayproduct.cfm?productID=1502). In some embodiments, the interior of housing 201 is coated with a light-absorbing material. In some embodiments, housing 201 is interchangeable with housing 120 of FIG. 1A1.

FIG. 2B1 is a perspective exploded view of a light-absorbing housing 202. In some embodiments, light-absorbing housing 202 includes a first top piece 227 and bottom piece 223. In some embodiments, instead of slots 225, top piece 227 includes extension portions 228 at the first and second end of top piece 227. In some embodiments, extension portions 228 of top piece 227 fit into slots 225 of bottom piece 223 such that an aperture is formed for guiding optical fiber 205 through housing 202 (in some such embodiments, top piece 227 is large enough relative to bottom piece 223 that top piece 227 can be slid onto bottom piece 223 to place housing 202 in a fully enclosed position.

FIG. 2B2 shows light-absorbing housing 202 in its assembled configuration. In some embodiments, housing 202 is interchangeable with housing 120 of FIG. 1A1 and with housing 201 of FIG. 2A.

FIG. 3 is a perspective view of a light-absorbing housing 301. In some embodiments, housing 301 includes a slot 325 that runs from a first end of housing 301 to a second, opposite end of housing 301. In some embodiments, optical fiber 305 is placed into housing 301 from the top such that optical fiber 305 rests at the bottom of slot 325. In some embodiments, slots 325 are shaped such that no light propagating from optical fiber 305 can escape housing 301 even when the top of housing 301 remains uncovered. In some embodiments, an open-slot housing such as housing 301 is interchangeable with housing 120 of FIG. 1A1, FIG. 1A2, FIG. 1A3, FIG. 1B1, FIG. 1B2, FIG. 1C, FIG. 1D, FIG. 1E, housing 201 of FIG. 2A1, or housing 202 of FIG. 2A2.

Figure 4B:
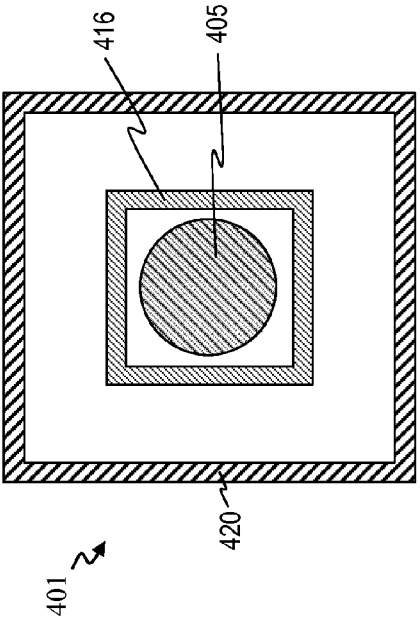
FIG. 4B is an end cross-sectional view of an in-line cladding-light dissipater 401.
Figure 4A:
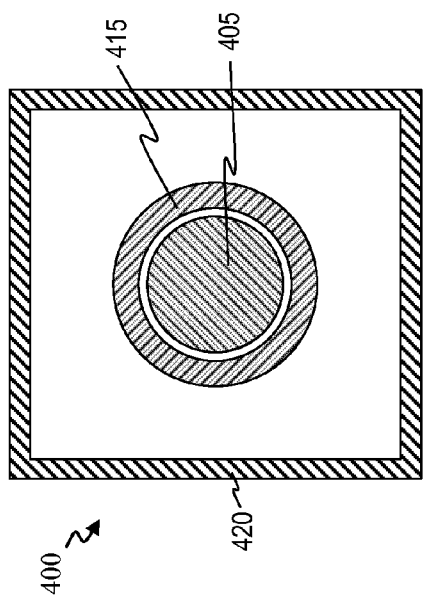
FIG. 4A is an end cross-sectional view of an in-line cladding-light dissipater 400.
Figure 4E:
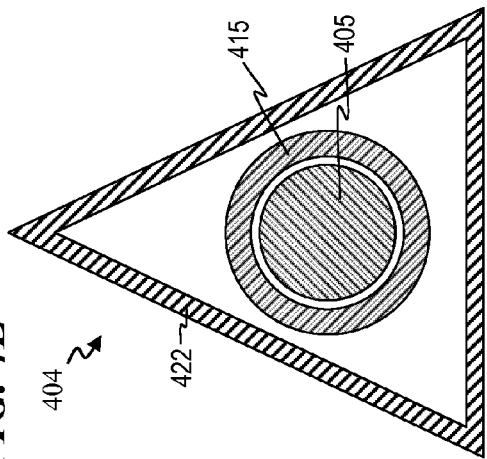
FIG. 4E is an end cross-sectional view of an in-line cladding-light dissipater 404.
Figure 4D:
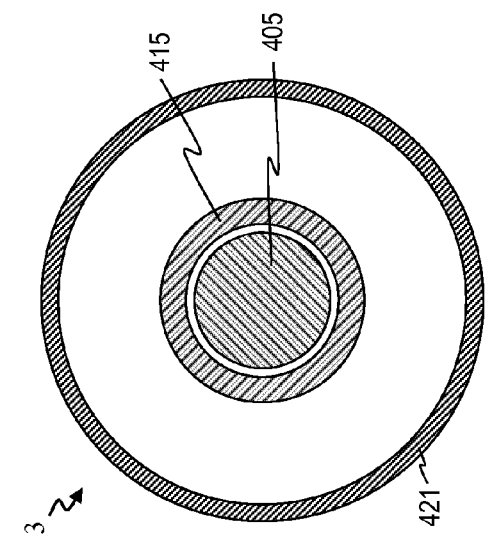
FIG. 4D is an end cross-sectional view of an in-line cladding-light dissipater 403.
Figure 4C:
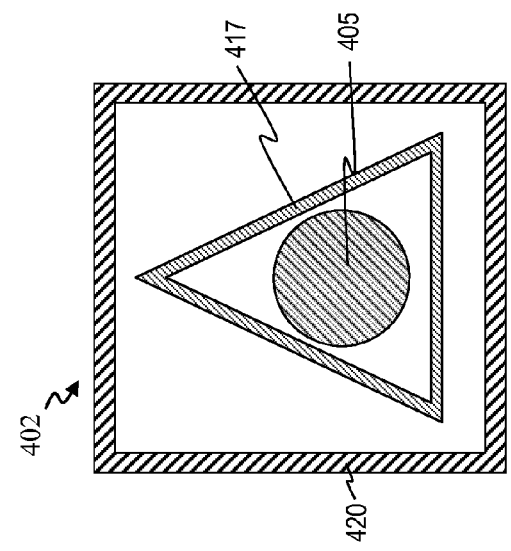
FIG. 4C is an end cross-sectional view of an in-line cladding-light dissipater 402.

FIG. 4A, FIG. 4B, FIG. 4C, FIG. 4D, and FIG. 4E illustrate a plurality of configurations of in-line cladding-light dissipaters that represent different embodiments of the present invention. FIG. 4A is a transverse cross-sectional view of an in-line cladding-light dissipater 400. In some embodiments, optical fiber 405 is surrounded by a circular transparent enclosure 415. In some embodiments, transparent enclosure 415 is enclosed within a rectangular light-absorbing housing 420. FIG. 4B is a transverse cross-sectional view of an in-line cladding-light dissipater 401. In some embodiments, optical fiber 405 is surrounded by a rectangular transparent enclosure 416. In some embodiments, transparent enclosure 416 is enclosed within a rectangular light-absorbing housing 420. FIG. 4C is a transverse cross-sectional view of an in-line cladding-light dissipater 402. In some embodiments, optical fiber 405 is surrounded by a triangular transparent enclosure 417. In some embodiments, transparent enclosure 417 is enclosed within a rectangular light-absorbing housing 420. FIG. 4D is a transverse cross-sectional view of an in-line cladding-light dissipater 403. In some embodiments, optical fiber 405 is surrounded by a circular transparent enclosure 415. In some embodiments, transparent enclosure 415 is enclosed within a circular light-absorbing housing 421. FIG. 4E is a transverse cross-sectional view of an in-line cladding-light dissipater 404. In some embodiments, optical fiber 405 is surrounded by a circular transparent enclosure 415. In some embodiments, transparent enclosure 415 is enclosed within a triangular light-absorbing housing 422. It is to be recognized that a wide variety of other geometries will work with the present invention and, therefore, the disclosure of the geometries shown in FIGS. 4A-4E is not to be construed as limiting.

Figure 5:
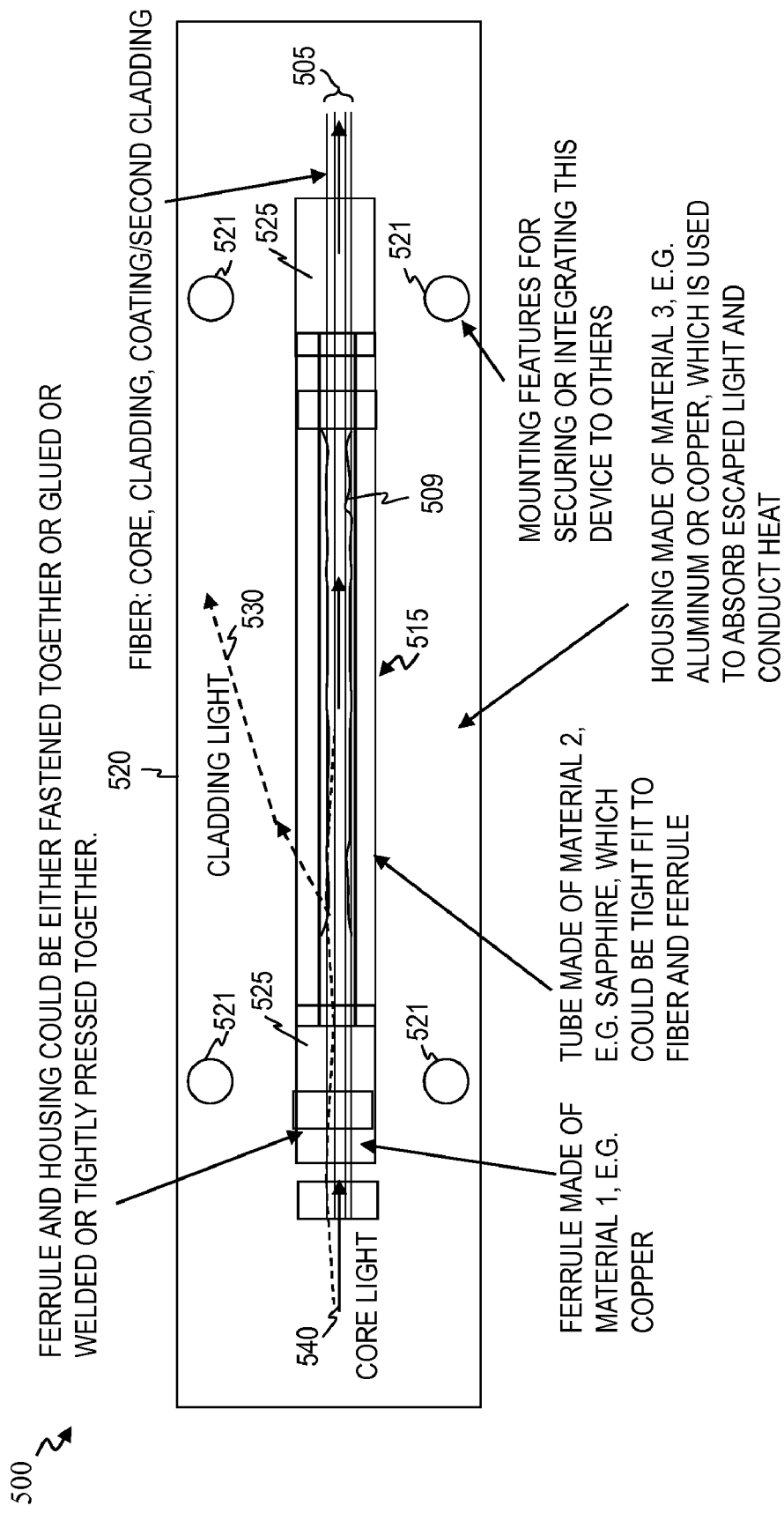
FIG. 5 is a schematic side view of an in-line cladding-light dissipater 500.

FIG. 5 is a schematic side view of an in-line cladding-light dissipater 500. In some embodiments, dissipater 500 includes an optical fiber 505. In some embodiments, a portion of fiber 505 includes a light-scattering surface 509 for scattering cladding light 530 away from optical fiber 505. In some embodiments, at least the portion of optical fiber 505 containing light-scattering surface 509 is located within a transparent enclosure 515. In some embodiments, the transparent enclosure 515 is further located within a light-absorbing housing 520. In some embodiments, core light 540 follows a path down the core of optical fiber 505 while cladding light 530 is scattered away from optical fiber 505 and through transparent enclosure 515 by light-scattering surface 509. Once scattered away from optical fiber 505, cladding light 530 is then absorbed by light-absorbing housing 520. In some embodiments, transparent enclosure 515 is held in a fixed relationship to optical fiber 505 and to housing 520 by ferrules 525. In some embodiments, housing 520 includes a plurality of mounting features 521 for securing or integrating the dissipater 500 to other devices or structures.

In some embodiments, a plurality of cladding-light dissipaters are used at a plurality of locations on an optical fiber 105 to strip cladding light away from the optical fiber 105 at the plurality of locations. In some embodiments, cladding-light dissipater 100 (see FIG. 1A1) is used for each one of the plurality of cladding-light dissipaters. In some embodiments, cladding-light dissipater 100 is used as at least one of the cladding-light dissipater. In some embodiments, cladding-light dissipater 100' (see FIG. 1A3) is used as at least one of the cladding-light dissipater. In some embodiments, cladding-light dissipater 101 (see FIG. 1C) is used as at least one of the cladding-light dissipater. In some embodiments, cladding-light dissipater 102 (see FIG. 1D) is used as at least one of the cladding-light dissipater. In some embodiments, cladding-light dissipater 103 (see FIG. 1E) is used as at least one of the cladding-light dissipater. In some embodiments, cladding-light dissipater 201 (see FIG. 2A1) is used as at least one of the cladding-light dissipater. In some embodiments, cladding-light dissipater 202 (see FIG. 2B1) is used as at least one of the cladding-light dissipater. In some embodiments, cladding-light dissipater 301 (see FIG. 3) is used as at least one of the cladding-light dissipater. In some embodiments, one or more of the cladding-light dissipaters 400-404 (see FIGS. 4A-4E) are used as at least one of the cladding-light dissipater. In some embodiments, any other suitable combination of the cladding-light dissipaters disclosed herein (or any suitable single cladding-light dissipater of the cladding-light dissipaters disclosed herein) is used for the plurality of cladding-light dissipaters. In some embodiments, two or more optical fibers, as described herein, have their cladding light stripped away within a single light-absorbing housing such that each of the two or more optical fibers have their own light-scattering surface and fiber-enclosure assembly, but a plurality of such fiber-enclosure assemblies is contained within a single light-absorbing housing (e.g., see FIG. 1C or FIG. 1D or FIG. 1E).

In some embodiments, the present invention provides an apparatus that includes an optical fiber having a core and a first cladding layer that surrounds the core, wherein a first portion of the optical fiber has a rough exterior surface, and wherein the rough exterior surface is configured to scatter light located in the first cladding layer away from the optical fiber; a transparent enclosure, wherein the transparent enclosure includes an opening that extends from a first end of the transparent enclosure to a second end of the transparent enclosure, and wherein at least the first portion of the optical fiber is located within the opening of the transparent enclosure, and wherein the transparent enclosure is not a cladding layer on the optical fiber; a light-absorbing housing configured to absorb the light scattered away from the optical fiber by the rough exterior surface; and a first mechanism configured to hold the optical fiber in a fixed relationship to the transparent enclosure. In some embodiments, the first mechanism includes a first and second ferrule, wherein the optical fiber extends from an opening in the first ferrule through the transparent enclosure and to an opening in the second ferrule.

In some embodiments, the present invention provides an apparatus that includes an optical fiber having a core and a first cladding layer that surrounds the core, wherein a first portion of the optical fiber has a rough exterior surface, and wherein the rough exterior surface is configured to scatter light located in the first cladding layer away from the optical fiber; a transparent enclosure, wherein the transparent enclosure includes a lengthwise slotted opening through a side of the transparent enclosure that extends from a first end of the transparent enclosure to a second end of the transparent enclosure, and wherein at least the first portion of the optical fiber is located within the slotted opening of the transparent enclosure, and wherein the transparent enclosure is not a cladding layer on the optical fiber; a light-absorbing housing configured to absorb the light scattered away from the optical fiber by the rough exterior surface; and a first mechanism configured to hold the optical fiber in a fixed relationship to the transparent enclosure. In some embodiments, the first mechanism includes a first and second slotted ferrule, wherein the optical fiber extends from a slotted opening in the first ferrule through the slotted transparent enclosure and to the slotted opening in the second ferrule.

In some embodiments, the present invention provides an apparatus that includes an optical fiber having a core and a first cladding layer that surrounds the core, wherein a first portion of the optical fiber has a light-scattering exterior surface, and wherein the light-scattering exterior surface is configured to scatter light located in the first cladding layer away from the optical fiber; a transparent enclosure, wherein the transparent enclosure includes an opening that extends from a first end of the transparent enclosure to a second end of the transparent enclosure, and wherein at least the first portion of the optical fiber is located within the through opening of the transparent enclosure, and wherein the transparent enclosure is not a cladding layer on the optical fiber; a light-absorbing housing configured to absorb the light scattered away from the optical fiber by the light-scattering exterior surface; a first mechanism configured to hold the optical fiber in a fixed relationship to the transparent enclosure; and a second mechanism configured to hold the transparent enclosure in a fixed relationship to the light-absorbing housing. In some embodiments, the first mechanism and the second mechanism are each ferrules, and the optical fiber is threaded through an opening in the first ferrule, extends the length of the transparent enclosure, and is threaded through an opening in the second ferrule at an opposite end of the transparent enclosure.

In some embodiments, the first mechanism includes a first ferrule piece and a second ferrule piece at opposite ends of the transparent enclosure, each holding the optical fiber, wherein the second mechanism includes a third ferrule piece and a fourth ferrule piece, wherein the first ferrule piece is integral with the third ferrule piece, and wherein the second ferrule piece is integral with the fourth ferrule piece, and wherein the light-absorbing housing includes an interior surface, and wherein the interior surface is coated with light-absorbing material.

In some embodiments, the first mechanism is made of a material that includes a polymer. In some embodiments, the first mechanism is made of a material that includes a metal. In some embodiments, the first mechanism is made of a material that includes a ceramic or other suitable material.

In some embodiments, the present invention provides an apparatus that includes an optical fiber having a core and a first cladding layer that surrounds the core, wherein a first portion of the optical fiber has a rough exterior surface, and wherein the rough exterior surface is configured to scatter light located in the first cladding layer away from the optical fiber; a transparent enclosure, wherein the transparent enclosure includes an opening that extends from a first end of the transparent enclosure to a second end of the transparent enclosure, and wherein at least the first portion of the optical fiber is located within the through opening of the transparent enclosure; a light-absorbing housing configured to enclose the optical fiber such that the light scattered away from the optical fiber by the rough exterior surface is absorbed by the light-absorbing housing; a first plurality of ferrule pieces including a first ferrule piece and a second ferrule piece, wherein the first and second ferrule pieces are configured to hold the optical fiber in a fixed relationship to the transparent enclosure; and a second plurality of ferrule pieces including a third ferrule piece and a fourth ferrule piece, wherein the third and fourth ferrule pieces are configured to hold the transparent enclosure in a fixed relationship to the light-absorbing housing, wherein the first ferrule piece is integral with the third ferrule piece, and wherein the second ferrule piece is integral with the fourth ferrule piece.

In some embodiments, the light-absorbing housing includes an interior surface, wherein the interior surface includes a thin layer of light-absorbing material. In some embodiments, the thin layer of light-absorbing material includes chalcolite.

In some embodiments, the optical fiber includes a second cladding layer, wherein the first cladding layer is disposed between the core and the second cladding layer. In some embodiments, a first length of at least 10 cm of the optical fiber extends from the first end of the transparent enclosure and a second length of at least 10 cm of the optical fiber extends from the second end of the transparent enclosure.

In some embodiments, the transparent enclosure is made of a material that includes quartz (in some such embodiments, the transparent enclosure is made of quartz). In some embodiments, the transparent enclosure is made of a material that includes sapphire (in some such embodiments, the transparent enclosure is made of sapphire). In some embodiments, the transparent enclosure is made of a material that includes glass or other suitable material.

In some embodiments, the first cladding layer of the optical fiber has a first index of refraction, and the light-scattering exterior surface of the first portion of the optical fiber includes a powder having a second index of refraction that is higher than the first index of refraction of the first cladding layer of the optical fiber. In some embodiments, the light-scattering exterior surface includes a surface etched by an acidic solution. In some embodiments, the light-scattering exterior surface includes a surface etched by a solution of hydrofluoric acid.

In some embodiments, the first ferrule piece is made from a material that includes a plastic. In some embodiments, the first ferrule piece is made from a material that includes a polymer. In some embodiments, the first ferrule piece, the second ferrule piece, or both include a metal. In some embodiments, the first ferrule piece, the second ferrule piece, or both are made of a material that includes copper. In some embodiments, the first ferrule piece, the second ferrule piece, or both are made of metal. In some embodiments, the first ferrule piece, the second ferrule piece, or both are made of copper. In some embodiments, the first ferrule piece is made from a material that includes a plastic, and the second ferrule piece is made from a material that includes a plastic. In any of these embodiments where a material includes a particular element or compound, in a subset of such embodiments, the material is made of 100% of the particular element or compound.

In some embodiments, the light-absorbing housing is metal. In some embodiments, the light-absorbing housing is made from a material that includes a metal. In some embodiments, the light-absorbing housing is made from a material that includes aluminum. In some embodiments, the light-absorbing housing is made from a material that includes copper. In some embodiments, the light-absorbing housing is made from a material that includes silver.

In some embodiments, the present invention provides a method for removing cladding light from an optical fiber, the method including providing an optical fiber having a core and a first cladding layer that surrounds the core; providing a transparent enclosure having an opening that extends from a first end of the transparent enclosure to a second end of the transparent enclosure, wherein the transparent enclosure is not a cladding layer on the optical fiber; forming a rough exterior surface of a first portion of the optical fiber such that the rough exterior surface scatters the cladding light located in the first cladding layer away from the optical fiber; providing a light-absorbing housing configured to absorb the cladding light scattered away from the optical fiber; guiding the optical fiber through the transparent enclosure such that at least the rough exterior surface of the first portion of the optical fiber is substantially enclosed in the transparent enclosure; holding the optical fiber in a fixed relationship to the transparent enclosure and holding the transparent enclosure in a fixed relationship to the light-absorbing housing; propagating the cladding light scattered away from the optical fiber through the transparent enclosure; and absorbing the propagated cladding light in the light-absorbing housing.

In some embodiments, the present invention provides a method for removing cladding light from an optical fiber, the method including providing an optical fiber having a core and a first cladding layer that surrounds the core; providing a transparent enclosure having an opening that extends from a first end of the transparent enclosure to a second end of the transparent enclosure, wherein the transparent enclosure is not a cladding layer on the optical fiber; forming a light-scattering exterior surface of a first portion of the optical fiber such that the light-scattering exterior surface scatters the cladding light located in the first cladding layer away from the optical fiber; providing a light-absorbing housing configured to absorb the cladding light scattered away from the optical fiber; threading the optical fiber through the opening in the transparent enclosure such that at least the light-scattering exterior surface of the first portion of the optical fiber is enclosed in the transparent enclosure; holding the optical fiber in a fixed relationship to the transparent enclosure and holding the transparent enclosure in a fixed relationship to the light-absorbing housing; propagating the cladding light scattered away from the optical fiber through the transparent enclosure; and absorbing the propagated cladding light in the light-absorbing housing.

In some embodiments, the forming of the thin layer of light-absorbing material includes anodizing the interior surface of the light-absorbing housing.

In some embodiments, the first cladding layer of the optical fiber has a first index of refraction, wherein the forming of the light-scattering exterior surface of the first portion of the optical fiber includes affixing a powder to an exterior surface of the first portion of the optical fiber, and wherein the powder has a second index of refraction that is higher than the first index of refraction of the first cladding layer of the optical fiber. In some embodiments, the forming of the light-scattering exterior surface of the first portion of the optical fiber includes wet etching an exterior surface of the first portion of the optical fiber. In some embodiments, the wet etching is performed using a solution that includes hydrofluoric acid. In some embodiments, the providing of the transparent enclosure includes providing a sapphire transparent enclosure.

In some embodiments, the present invention provides a method for scattering cladding light away from an optical fiber, the method including providing an optical fiber having a core and a first cladding layer that surrounds the core; providing a transparent enclosure having an opening that extends from a first end of the transparent enclosure to a second end of the transparent enclosure; providing a light-absorbing housing having an opening that extends from a first end of the light-absorbing housing to a second end of the light-absorbing housing; forming a light-scattering exterior surface of a first portion of the first cladding layer of the optical fiber such that the light-scattering exterior surface scatters the cladding light located in the first cladding layer away from the optical fiber; threading the optical fiber through the opening in the transparent enclosure such that at least the light-scattering exterior surface of the first portion of the optical fiber is enclosed in the transparent enclosure;

holding the optical fiber in a fixed relationship to the transparent enclosure and holding the transparent enclosure in a fixed relationship to the light-absorbing housing; propagating the cladding light scattered away from the optical fiber through the transparent enclosure; and absorbing the propagated cladding light in the light-absorbing housing.

In some embodiments, the providing of the light-absorbing housing includes forming a thin layer of light-absorbing material on an interior surface of the light-absorbing housing. In some embodiments, the forming of the thin layer of light-absorbing material includes anodizing the interior surface of the light-absorbing housing such that a thin layer of chalcolite is formed on the interior surface of the light-absorbing housing.

In some embodiments, the providing of the optical fiber includes providing a second cladding layer, wherein the first cladding layer is disposed between the core and the second cladding layer.

In some embodiments, the threading of the optical fiber includes extending a first length of at least 10 cm of the optical fiber from the first end of the transparent enclosure and extending a second length of at least 10 cm of the optical fiber from the second end of the transparent enclosure.

In some embodiments, the first cladding layer of the optical fiber has a first index of refraction, wherein the forming of the light-scattering exterior surface of the first portion of the first cladding layer includes affixing a powder to the first portion of the first cladding layer, and wherein the powder has a second index of refraction that is higher than the first index of refraction of the first cladding layer of the optical fiber.

In some embodiments, the forming of the light-scattering exterior surface of the first portion of the first cladding layer includes wet etching the first portion of the first cladding layer. In some embodiments, the wet etching is performed using a solution that includes hydrofluoric acid. In some embodiments, the forming of the light-scattering exterior surface of the first portion of the first cladding layer includes dry etching the first portion of the first cladding layer.

In some embodiments, the providing of the transparent enclosure includes providing a sapphire transparent enclosure. In some embodiments, the providing of the transparent enclosure includes providing a transparent quartz enclosure.

In some embodiments, the present invention provides a method for scattering cladding light away from an optical fiber, the method including providing an optical fiber having a core and a first cladding layer that surrounds the core; providing a transparent enclosure having an opening that extends from a first end of the transparent enclosure to a second end of the transparent enclosure; providing a light-absorbing housing having an opening that extends from a first end of the housing to a second end of the housing; forming a light-scattering exterior surface of a first portion of the first cladding layer of the optical fiber such that the light-scattering exterior surface scatters the cladding light located in the first cladding layer away from the optical fiber; threading the optical fiber through the opening in the transparent enclosure such that at least the light-scattering exterior surface of the first portion of the optical fiber is enclosed in the transparent enclosure; propagating the cladding light scattered away from the optical fiber through the transparent enclosure; and absorbing the propagated cladding light in the housing.

In some embodiments, the present invention provides a method for dissipating cladding light from an optical fiber, the method including providing an optical fiber having a core and at least a first cladding layer that surrounds the core; providing a transparent housing having an opening that extends from a first end of the transparent housing to a second end of the transparent housing; providing an opaque housing having an opening that extends from a first end of the opaque housing to a second end of the opaque housing; forming a light-scattering exterior surface of a first portion of the first cladding layer of the optical fiber such that the light-scattering exterior surface scatters the cladding light located in the first cladding layer away from the optical fiber, wherein a first length of unroughened fiber extends from the first end of the transparent housing and a second length of unroughened fiber extends from the second end of the transparent housing; and mechanically strengthening the optical fiber by threading (or otherwise guiding) the optical fiber through the opening in the transparent housing such that the light-scattering portion of the optical fiber is enclosed in the transparent housing.

It is specifically contemplated that the present invention includes embodiments having combinations and subcombinations of the various embodiments and features that are individually described herein (i.e., rather than listing every combinatorial of the elements, this specification includes descriptions of representative embodiments and contemplates embodiments that include some of the features from one embodiment combined with some of the features of another embodiment). It also is specifically contemplated that some embodiments of the invention include supersets and/or subsets of the embodiments and combinations described herein combined with one or more embodiments of the related applications recited herein, including U.S. Pat. Nos. 7,199,924, 7,391,561, 7,429,734, 7,471,705, and 7,539,231 U.S. patent application Ser. Nos. 11/565,619, 11/688,854, 12/018,874, 12/050,937, and 12/624,327, and U.S. Provisional Patent Application No. 61/263,736, or any of the other patents, patent applications, and provisional patent applications listed herein, which are all hereby incorporated herein by reference. Further, some embodiments include fewer than all the components described as part of any one of the embodiments described herein.

It is to be understood that the above description is intended to be illustrative, and not restrictive. Although numerous characteristics and advantages of various embodiments as described herein have been set forth in the foregoing description, together with details of the structure and function of various embodiments, many other embodiments and changes to details will be apparent to those of skill in the art upon reviewing the above description. The scope of the invention should be, therefore, determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

What is claimed is:

1. An apparatus comprising:
a light-absorbing housing having a first end and a second end;
an optical fiber having a core, a first cladding layer that surrounds the core, and a second cladding layer that has a lower index of refraction than the first cladding layer and that surrounds the first cladding layer, the optical fiber having a first portion held within the light-absorbing housing, wherein the first portion of the optical fiber extends from the first end to the second end of the light-absorbing housing, wherein the optical fiber does not have the second cladding layer on a subportion of the first portion of the optical fiber, wherein the subportion has a light-scattering exterior surface on the first cladding layer on an entire length of the subportion that extends from a first end of the subportion to a second end of the subportion, wherein the second cladding layer covers the first cladding layer immediately adjacent to the first end of the subportion, wherein the second cladding layer covers the first cladding layer immediately adjacent to the second end of the subportion, wherein the first portion has a continuous core and no splices between the first end and the second end of the light-absorbing housing, wherein the light-scattering exterior surface is configured to scatter light located in the first cladding layer away from the optical fiber, and wherein the light-absorbing housing absorbs the light scattered away from the optical fiber by the light-scattering exterior surface;

a transparent enclosure, wherein the transparent enclosure includes an opening that extends from a first end of the transparent enclosure to a second end of the transparent enclosure, wherein the subportion of the first portion of the optical fiber is located within the transparent enclosure, and wherein the transparent enclosure is not a cladding layer on the optical fiber; and a first mechanism that holds the optical fiber in a fixed relationship to the transparent enclosure.

2. The apparatus of claim 1, wherein a first length of at least ten centimeters of the optical fiber extends from the first end of the transparent enclosure and a second length of at least ten centimeters of the optical fiber extends from the second end of the transparent enclosure, and wherein the optical fiber has no splices within and between the first length, the first portion, and the second length.

3. The apparatus of claim 1, wherein the transparent enclosure is made of a material that includes quartz.

4. The apparatus of claim 1, wherein the transparent enclosure is made of a material that includes sapphire.

5. The apparatus of claim 1, wherein the first cladding layer of the optical fiber has a first index of refraction, and wherein the light-scattering exterior surface of the first portion of the optical fiber includes a powder having a second index of refraction that is higher than the first index of refraction of the first cladding layer of the optical fiber.

6. The apparatus of claim 1, wherein the first mechanism is made of a material that includes a metal.

7. The apparatus of claim 1, wherein the first mechanism is made of a material that includes a polymer.

8. The apparatus of claim 1, wherein the optical fiber has a first total length, and wherein the first total length of the optical fiber is longer than a straight-line distance between the first end of the light-absorbing housing and the second end of the light-absorbing housing.

9. The apparatus of claim 1, wherein the optical fiber is a first optical fiber of a plurality of optical fibers, each substantially similar to the first optical fiber, and wherein the first portion of each one of the plurality of optical fibers is held within the light-absorbing housing.

10. The apparatus of claim 1, wherein a diameter of the first cladding at the first end of the first portion equals a diameter of the first cladding at the second end of the first portion and wherein a diameter of the second cladding at the first end of the first portion equals a diameter of the second cladding at the second end of the first portion.

11. The apparatus of claim 1, wherein the first mechanism that holds the optical fiber includes a first ferrule coupled to the first end of the light-absorbing housing and a second ferrule coupled to the second end of the light-absorbing housing.

12. A method for removing cladding light from an optical fiber, the method comprising:

providing a light-absorbing housing having a first end and a second end;

providing an optical fiber having a core, a first cladding layer that surrounds the core, and a second cladding layer that has a lower index of refraction than the first cladding layer and that surrounds the first cladding layer, the optical fiber having a first portion held within the light-absorbing housing, wherein the first portion of the optical fiber extends from the first end to the second end of the light-absorbing housing, wherein the optical fiber does not have the second cladding layer on a subportion of the first portion of the optical fiber;

providing a transparent enclosure having an opening that extends from a first end of the transparent enclosure to a second end of the transparent enclosure, wherein the transparent enclosure is not a cladding layer on the optical fiber;

forming a light-scattering exterior surface on the first cladding layer on an entire length of the subportion that extends from a first end of the subportion to a second end of the subportion, wherein the second cladding layer covers the first cladding layer immediately adjacent to the first end of the subportion, wherein the second cladding layer covers the first cladding layer immediately adjacent to the second end of the subportion, wherein the first portion has a continuous core and no splices between the first end and the second end of the light-absorbing housing, wherein the light-scattering exterior surface scatters the cladding light located in the first cladding layer away from the optical fiber;

guiding the optical fiber through the opening in the transparent enclosure such that the subportion of the first portion of the optical fiber is enclosed in the transparent enclosure;

holding the optical fiber in a fixed relationship to the transparent enclosure and holding the transparent enclosure in a fixed relationship to the light-absorbing housing;

propagating the cladding light scattered away from the optical fiber through the transparent enclosure to the light-absorbing housing; and absorbing the propagated cladding light in the light-absorbing housing.

13. The method of claim 12, wherein the forming of the light-scattering exterior surface on the first cladding layer of the subportion of the first portion of the optical fiber includes wet etching an exterior surface of the subportion of the first portion of the optical fiber.

14. The method of claim 12, wherein the forming of the light-scattering exterior surface on the first cladding layer of the subportion of the first portion of the optical fiber includes wet etching an exterior surface of the subportion of the first portion of the optical fiber using a solution that includes hydrofluoric acid.

15. The method of claim 12, wherein the providing of the transparent enclosure includes providing a sapphire transparent enclosure.

16. The method of claim 12, wherein the providing of the light-absorbing housing includes forming a thin layer of light-absorbing material on an interior surface of the light-absorbing housing.

17. The method of claim 12, wherein the guiding of the optical fiber includes extending a first length of at least ten centimeters of the optical fiber from the first end of the transparent enclosure and extending a second length of at least ten centimeters of the optical fiber from the second end of the transparent enclosure, and wherein the optical fiber has no splices within and between the first length, the first portion, and the second length.

18. The method of claim 12, wherein the first cladding layer of the optical fiber has a first index of refraction, wherein the forming of the light-scattering exterior surface of the first portion of the optical fiber includes affixing a powder to an exterior surface of the first portion of the optical fiber, and wherein the powder has a second index of refraction that is higher than the first index of refraction of the first cladding layer of the optical fiber.

19. An apparatus for scattering cladding light away from an optical fiber, the apparatus comprising:
- means for absorbing cladding light having a first end and a second end;
- an optical fiber having a core, a first cladding layer that surrounds the core, and a second cladding layer that has a lower index of refraction than the first cladding layer and that surrounds the first cladding layer, the optical fiber having a first portion held within the means for absorbing cladding light, wherein the first portion of the optical fiber extends from the first end to the second end of the means for absorbing cladding light, wherein the optical fiber does not have the second cladding layer on a subportion of the first portion of the optical fiber;
- means for scattering the cladding light located in the first cladding layer away from the optical fiber, wherein the means for absorbing cladding light is configured to absorb the cladding light scattered away from the optical fiber by the means for scattering, wherein the means for scattering is located on an entire length of the subportion that extends from a first end of the subportion to an opposite second end of the subportion, wherein the second cladding layer covers the first cladding layer immediately adjacent to the first end of the subportion, wherein the second cladding layer covers the first cladding layer immediately adjacent to the second end of the subportion, wherein the first portion has a continuous core and no splices between the first end and the second end of the means for absorbing cladding light; and
- transparent means for mechanically strengthening the optical fiber.

20. The apparatus of claim 19, wherein the transparent means for mechanically strengthening the optical fiber includes means for enclosing the subportion of the first portion of the optical fiber.

21. The apparatus of claim 19, wherein the transparent means for mechanically strengthening the optical fiber is made from a material that includes sapphire.

22. An apparatus comprising:
- a light-absorbing housing having a first end and a second end;
- a first ferrule and a second ferrule, each having a through-hole that extends from an exterior end to an interior end of the respective ferrule;
- a first transparent tube having a first end and a second end;
- a first optical fiber having a core, a first cladding layer that surrounds the core, and a second cladding layer that surrounds the first cladding layer,
  - wherein the first cladding layer has a lower index of refraction than the core,
  - wherein the second cladding layer has a lower index of refraction than the first cladding layer,
  - wherein the first ferrule extends to its interior end inside the first end of the light-absorbing housing and supports the first end of the first transparent tube,
  - wherein the second ferrule extends to its interior end inside the second end of the light-absorbing housing and supports the second end of the first transparent tube,
  - wherein the first optical fiber passes through the through-hole of the first ferrule, through a space inside the first transparent tube between the first ferrule and the second ferrule, and through the through-hole of the second ferrule,
  - wherein the first optical fiber has a light-scattering exterior surface on the first cladding layer on a first portion of the first optical fiber within the first transparent tube and does not have the second cladding layer on the first portion of the first optical fiber that has the light-scattering exterior surface,
  - wherein the first optical fiber has no splices between the exterior end of the first ferrule and the exterior end of the second ferrule, and
  - wherein the light-absorbing housing absorbs the light scattered away from the first optical fiber by the light-scattering exterior surface.

23. The apparatus of claim 22, further comprising:
- a third ferrule and a fourth ferrule, each having a through-hole that extends from an exterior end to an interior end of the respective ferrule;
- a second transparent tube having a first end and a second end;
- a second optical fiber having a core, a first cladding layer that surrounds the core, and a second cladding layer that has a lower index of refraction than the first cladding layer and that surrounds the first cladding layer,
  - wherein the first cladding layer has a lower index of refraction than the core,
  - wherein the second cladding layer has a lower index of refraction than the first cladding layer,
  - wherein the third ferrule extends to its interior end inside the first end of the light-absorbing housing and supports the first end of the second transparent tube,
  - wherein the fourth ferrule extends to its interior end inside the second end of the light-absorbing housing and supports the second end of the second transparent tube,
  - wherein the second optical fiber passes through the through-hole of the third ferrule, through a space inside the second transparent tube between the third ferrule and the fourth ferrule, and through the through-hole of the fourth ferrule,
  - wherein the second optical fiber has a light-scattering exterior surface on the first cladding layer on a first portion of the second optical fiber within the second transparent tube and does not have the second cladding layer on the first portion of the second optical fiber that has the light-scattering exterior surface,
  - wherein the second optical fiber has no splices between the exterior end of the third ferrule and the exterior end of the fourth ferrule, and
  - wherein the light-absorbing housing absorbs the light scattered away from the second optical fiber by the light-scattering exterior surface.

24. The apparatus of claim 22,
- wherein a diameter of the first cladding at a first end of the first portion of the first optical fiber equals a diameter of the first cladding at a second end of the first portion of the first optical fiber, and
- wherein a diameter of the second cladding at the first end of the first portion of the first optical fiber equals a diameter of the second cladding at the second end of the first portion.

25. The apparatus of claim 22, wherein the first transparent tube is looped within the light-absorbing housing.

* * * * *